United States Patent
Zhuang et al.

(10) Patent No.: US 11,936,551 B2
(45) Date of Patent: Mar. 19, 2024

(54) BGP ROUTE IDENTIFICATION METHOD, APPARATUS, AND DEVICE

(71) Applicant: Huawei Technologies Co., Ltd., Shenzhen (CN)

(72) Inventors: Shunwan Zhuang, Beijing (CN); Haibo Wang, Beijing (CN); Yunan Gu, Beijing (CN); Gang Yan, Beijing (CN); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 139 days.

(21) Appl. No.: 17/471,571

(22) Filed: Sep. 10, 2021

(65) Prior Publication Data
US 2021/0409304 A1 Dec. 30, 2021

Related U.S. Application Data

(63) Continuation of application No. PCT/CN2019/128537, filed on Dec. 26, 2019.

(30) Foreign Application Priority Data

Mar. 11, 2019 (CN) .......................... 201910181646.7

(51) Int. Cl.
*G06F 15/16* (2006.01)
*H04L 45/00* (2022.01)
(Continued)

(52) U.S. Cl.
CPC ............ *H04L 45/021* (2013.01); *H04L 45/04* (2013.01); *H04L 45/18* (2013.01); *H04L 45/22* (2013.01)

(58) Field of Classification Search
CPC ... H04L 45/021; H04L 45/18; H04L 63/1425; H04L 63/1466
See application file for complete search history.

(56) References Cited

U.S. PATENT DOCUMENTS 7,558,877 B1 * 7/2009 Fedyk ..................... H04L 63/20
709/242
7,930,424 B1 4/2011 Nucci et al.
(Continued)

FOREIGN PATENT DOCUMENTS

CN 101420443 A 4/2009
CN 101656638 A 2/2010
(Continued)

OTHER PUBLICATIONS

Tseng, J. et al., "Internet Storage Name Service (iSNS)", Network Working Group, Request for Comments: 4171, Category: Standards Track, Sep. 2005, 123 pages.
(Continued)

*Primary Examiner* — Hieu T Hoang
(74) *Attorney, Agent, or Firm* — Slater Matsil, LLP

(57) ABSTRACT

A BGP route identification method and apparatus are provided. A network device obtains a BGP route. The BGP route includes an autonomous system path attribute AS_PATH attribute, the AS_PATH attribute includes a first autonomous system number AS number, an AS number corresponding to an autonomous system that the network device is located in or manages is a second AS number, and the first AS number is equal to the second AS number. The network device determines, based on the first AS number and the second AS number, whether the BGP route is abnormal.

17 Claims, 6 Drawing Sheets

A network device obtains a BGP route, where the BGP route includes an autonomous system path attribute AS_PATH attribute, the AS_PATH attribute includes a first autonomous system number AS number, an AS number corresponding to an autonomous system that the network device is located in or manages is a second AS number, and the first AS number is equal to the second AS number — S401

The network device determines, based on the first AS number and the second AS number, whether the BGP route is abnormal — S402

(51) Int. Cl.
*H04L 45/02* (2022.01)
*H04L 45/021* (2022.01)
*H04L 45/18* (2022.01)

(56) References Cited

U.S. PATENT DOCUMENTS

| | | | | |
|---|---|---|---|---|
| 2007/0153763 | A1* | 7/2007 | Rampolla | H04L 45/26 370/351 |
| 2011/0093612 | A1 | 4/2011 | Murakami | |
| 2017/0324738 | A1* | 11/2017 | Hari | H04W 12/108 |
| 2019/0098046 | A1* | 3/2019 | Schlamp | H04L 45/04 |
| 2019/0372886 | A1* | 12/2019 | Beck | H04L 45/22 |
| 2020/0186458 | A1* | 6/2020 | Farag | G06F 16/1824 |
| 2021/0194918 | A1* | 6/2021 | Earl | H04L 63/1416 |

FOREIGN PATENT DOCUMENTS

| | | |
|---|---|---|
| CN | 101662393 A | 3/2010 |
| CN | 102315988 A | 1/2012 |
| CN | 102394794 A | 3/2012 |
| CN | 106060014 A | 10/2016 |
| CN | 108496328 A | 9/2018 |
| CN | 108886521 A | 11/2018 |
| WO | 03007556 A2 | 1/2003 |

OTHER PUBLICATIONS

Rekhter, Y. et al., "A Border Gateway Protocol 4 (BGP-4)", Network Working Group, Request for Comments: 4271, Obsoletes: 1771, Category: Standards Track, Jan. 2006, 104 pages.

Scudder, J. et al., "BGP Monitoring Protocol (BMP)", Internet Engineering Task Force (IETF), Request for Comments: 7854, Category: Standards Track, ISSN: 2070-1721, Jun. 2016, 27 pages.

Deng, W. et al., "Rousseau: A Monitoring System for Interdomain Routing Security", Communication Networks and Services Research Conference, , IEEE Computer Society, May 5, 2008 (May 5, 2008), 8 pages.

Sermpezis, P. et al., "ARTEMIS: Neutralizing BGP Hijacking Within a Minute", IEEE /ACM Transactions on Networking, Dec. 1, 2018 (Dec. 1, 2018), 16 pages, vol. 26, No. 6.

Lad, M. et al., "PHAS: A Prefix Hijack Alert System", Security '06: 15th USENIX Security Symposium, Aug. 2, 2006 (Aug. 2, 2006), 14 pages.

* cited by examiner

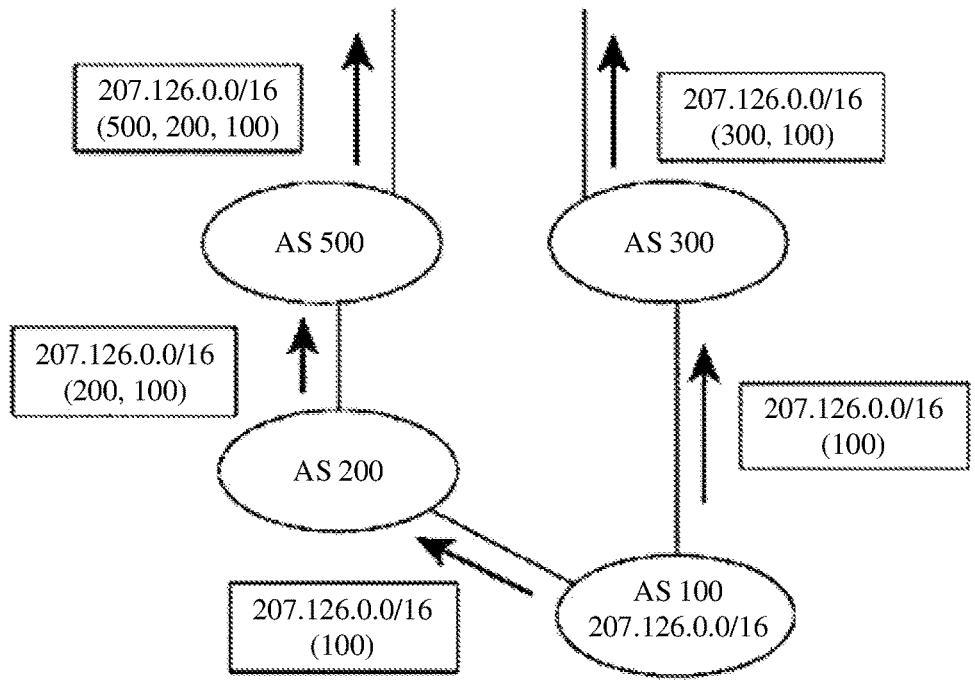

FIG. 3

| A network device obtains a BGP route, where the BGP route includes an autonomous system path attribute AS_PATH attribute, the AS_PATH attribute includes a first autonomous system number AS number, an AS number corresponding to an autonomous system that the network device is located in or manages is a second AS number, and the first AS number is equal to the second AS number | ~ S401 |

| The network device determines, based on the first AS number and the second AS number, whether the BGP route is abnormal | ~ S402 |

FIG. 4

BGP ROUTE IDENTIFICATION METHOD, APPARATUS, AND DEVICE

CROSS-REFERENCE TO RELATED APPLICATIONS

This application is a continuation of International Application No. PCT/CN2019/128537, filed on Dec. 26, 2019, which claims priority to Chinese Patent Application No. 201910181646.7, filed on Mar. 11, 2019. The disclosures of the aforementioned applications are hereby incorporated by reference in their entireties.

TECHNICAL FIELD

Embodiments of this application relate to the field of communications technologies, and in particular, to a BGP route identification method and apparatus, and a device.

BACKGROUND

An autonomous system (AS) is a network unit that can independently determine which routing protocol is used in the system. Each autonomous system corresponds to one globally unique autonomous system number (AS number). A border gateway protocol (BGP) is used for route information transmission between different autonomous systems. Each autonomous system includes at least one routing device. One of the at least one routing device serves as a BGP speaker of the autonomous system, to establish a BGP session with a BGP speaker in another autonomous system, so as to propagate route information through the BGP session.

A BGP route propagated between different autonomous systems includes an autonomous system path attribute (AS_PATH attribute). The AS_PATH attribute indicates all autonomous systems between a local autonomous system and an origin autonomous system (Origin AS) of the BGP route. For example, an AS 1 sends a BGP route to an AS 2. When a routing device serving as a BGP speaker in the AS 1 sends a BGP route to a routing device serving as a BGP speaker in the AS 2, the AS 1 adds an AS number corresponding to the local autonomous system to the forefront (leftmost) of the AS_PATH attribute and then sends the BGP route.

In a conventional technology, to avoid a routing loop, after receiving a BGP route, the AS 2 detects an AS_PATH attribute in the BGP route. If the AS_PATH attribute includes an AS number corresponding to the local autonomous system, the BGP route is directly discarded or ignored. Alternatively, after the AS 1 generates a BGP route and before the AS 1 sends the BGP route, the AS 1 performs loop detection on the to-be-sent BGP route. If the AS_PATH attribute includes the AS number corresponding to a peer autonomous system AS, the BGP route is directly discarded or ignored.

In an actual application, an attacker often hijacks a BGP route and forges the BGP route. A BGP route propagation mechanism in the conventional technology cannot find route hijacking in a timely manner, causing a network security risk.

SUMMARY

Embodiments of this application provide a BGP route identification method and apparatus, and a device, to find a route exception in a timely manner and improve network security.

According to a first aspect, an embodiment of this application provides a border gateway protocol BGP route identification method. The method includes:

A network device obtains a BGP route. The BGP route includes an autonomous system path attribute AS_PATH attribute, the AS_PATH attribute includes a first autonomous system number AS number, an AS number corresponding to an autonomous system that the network device is located in or manages is a second AS number, and the first AS number is equal to the second AS number.

The network device determines, based on the first AS number and the second AS number, whether the BGP route is abnormal.

Optionally, the BGP route includes a first Internet protocol IP prefix.

That the network device determines, based on the first AS number and the second AS number, whether the BGP route is abnormal includes:

When the first AS number is the $1^{st}$ element in the AS_PATH attribute and the network device has not advertised a route including the first IP prefix, the network device determines that the BGP route is abnormal.

Optionally, the BGP route includes a first Internet protocol IP prefix.

That the network device determines, based on the first AS number and the second AS number, whether the BGP route is abnormal includes:

When the first AS number is the $1^{st}$ element in the AS_PATH attribute, the network device has advertised a route including a second IP prefix, and the network device has not advertised a route including the first IP prefix, the network device determines that the BGP route is abnormal. The first IP prefix is a subprefix of the second IP prefix.

Optionally, the BGP route includes a first Internet protocol IP prefix.

That the network device determines, based on the first AS number and the second AS number, whether the BGP route is abnormal includes:

When the first AS number is the $1^{st}$ element in the AS_PATH attribute, the network device has advertised, to a specific AS, a route that is dedicated to the specific AS and that includes the first IP prefix, and the AS_PATH attribute includes a third AS number or does not include the second AS number, the network device determines that the BGP route is abnormal.

Optionally, that the network device determines, based on the first AS number and the second AS number, whether the BGP route is abnormal includes:

When the first AS number is not the $1^{st}$ element in the AS_PATH attribute, and no BGP session is established between an autonomous system that the network device is located in or manages and an autonomous system corresponding to a fourth AS number, the network device determines that the BGP route is abnormal. The fourth AS number is an element in the AS_PATH attribute that neighbors to the first AS number.

Optionally, the BGP route includes a first Internet protocol IP prefix.

That the network device determines, based on the first AS number and the second AS number, whether the BGP route is abnormal includes:

When the first AS number is not the $1^{st}$ element in the AS_PATH attribute, a BGP session is established between a left AS and an autonomous system that the network device is located in or manages, a BGP session is established between a right AS and the autonomous system that the network device is located in or manages, and the network device has not received a route that includes the first IP prefix and that is from the right AS or the network device has not advertised a route including the first IP prefix to the left AS, the network device determines that the BGP route is abnormal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

According to a second aspect, an embodiment of this application provides a border gateway protocol BGP route identification method. The method includes:

A network device obtains a BGP route. The BGP route includes an autonomous system path attribute AS_PATH attribute, the AS_PATH attribute includes a first autonomous system number AS number, an AS number corresponding to a neighboring autonomous system of an autonomous system that the network device is located in or manages is a second AS number, and the first AS number is equal to the second AS number.

The network device determines, based on the first AS number and the second AS number, whether the BGP route is abnormal.

Optionally, the BGP route includes a first Internet protocol IP prefix.

That the network device determines, based on the first AS number and the second AS number, whether the BGP route is abnormal includes:

When the first AS number is the $1^{st}$ element in the AS_PATH attribute and the neighboring autonomous system has not advertised a route including the first IP prefix, the network device determines that the BGP route is abnormal.

Optionally, the BGP route includes a first Internet protocol IP prefix.

That the network device determines, based on the first AS number and the second AS number, whether the BGP route is abnormal includes:

When the first AS number is the $1^{st}$ element in the AS_PATH attribute, the neighboring autonomous system has advertised a route including a second IP prefix, and the neighboring autonomous system has not advertised a route including the first IP prefix, the network device determines that the BGP route is abnormal. The first IP prefix is a subprefix of the second IP prefix.

Optionally, that the network device determines, based on the first AS number and the second AS number, whether the BGP route is abnormal includes:

When the first AS number is not the $1^{st}$ element in the AS_PATH attribute and no BGP session is established between the neighboring autonomous system and an autonomous system corresponding to a third AS number, the network device determines that the BGP route is abnormal. The third AS number is an element in the AS_PATH attribute that neighbors to the first AS number.

Optionally, the BGP route includes a first Internet protocol IP prefix.

That the network device determines, based on the first AS number and the second AS number, whether the BGP route is abnormal includes:

When the first AS number is not the $1^{st}$ element in the AS_PATH attribute, a BGP session is established between the neighboring autonomous system and a left AS, a BGP session is established between the neighboring autonomous system and a right AS, the neighboring autonomous system has received a route that includes a first IP prefix and that is from the right AS, and the neighboring autonomous system has not advertised a route including the first IP prefix to the left AS, the network device determines that the BGP route is abnormal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

According to a third aspect, an embodiment of this application provides a border gateway protocol BGP route identification apparatus, including: an obtaining module, configured to obtain a BGP route, where the BGP route includes an autonomous system path attribute AS_PATH attribute, the AS_PATH attribute includes a first autonomous system number AS number, an AS number corresponding to an autonomous system that the network device is located in or manages is a second AS number, and the first AS number is equal to the second AS number; and an identification module, configured to determine, based on the first AS number and the second AS number, whether the BGP route is abnormal.

Optionally, the BGP route includes a first Internet protocol IP prefix, and the identification module is specifically configured to: when the first AS number is the $1^{st}$ element in the AS_PATH attribute and the network device has not advertised a route including the first IP prefix, determine that the BGP route is abnormal.

Optionally, the BGP route includes a first Internet protocol IP prefix, and the identification module is specifically configured to: when the first AS number is the $1^{st}$ element in the AS_PATH attribute, the network device has advertised a route including a second IP prefix, and the network device has not advertised a route including the first IP prefix, determine that the BGP route is abnormal, where the first IP prefix is a subprefix of the second IP prefix.

Optionally, the BGP route includes a first Internet protocol IP prefix, and the identification module is specifically configured to: when the first AS number is the $1^{st}$ element in the AS_PATH attribute, the network device has advertised, to a specific AS, a route that is dedicated to the specific AS and that includes the first IP prefix, and the AS_PATH attribute includes a third AS number or does not include the second AS number, determine that the BGP route is abnormal.

Optionally, the identification module is specifically configured to: when the first AS number is not the $1^{st}$ element in the AS_PATH attribute, and no BGP session is established between an autonomous system that the network device is located in or manages and an autonomous system corresponding to a fourth AS number, determine that the BGP route is abnormal, where the fourth AS number is an element in the AS_PATH attribute that neighbors to the first AS number.

Optionally, the BGP route includes a first Internet protocol IP prefix, and the identification module is specifically configured to: when the first AS number is not the $1^{st}$ element in the AS_PATH attribute, a BGP session is established between a left AS and an autonomous system that the network device is located in or manages, a BGP session is established between a right AS and the autonomous system that the network device is located in or manages, and the network device has not received a route that includes the first IP prefix and that is from the right AS or the network device has not advertised a route including the first IP prefix to the left AS, determine that the BGP route is abnormal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

According to a fourth aspect, an embodiment of this application provides a border gateway protocol BGP route identification apparatus, including: an obtaining module, configured to obtain a BGP route, where the BGP route includes an autonomous system path attribute AS_PATH attribute, the AS_PATH attribute includes a first autonomous system number AS number, an AS number corresponding to a neighboring autonomous system of an autonomous system that the network device is located in or manages is a second AS number, and the first AS number is equal to the second AS number; and an identification module, configured to determine, based on the first AS number and the second AS number, whether the BGP route is abnormal.

Optionally, the BGP route includes a first Internet protocol IP prefix, and the identification module is specifically configured to: when the first AS number is the $1^{st}$ element in the AS_PATH attribute and the neighboring autonomous system has not advertised a route including the first IP prefix, determine that the BGP route is abnormal.

Optionally, the BGP route includes a first Internet protocol IP prefix, and the identification module is specifically configured to: when the first AS number is the $1^{st}$ element in the AS_PATH attribute, the neighboring autonomous system has advertised a route including a second IP prefix, and the neighboring autonomous system has not advertised a route including the first IP prefix, determine that the BGP route is abnormal, where the first IP prefix is a subprefix of the second IP prefix.

Optionally, the identification module is specifically configured to: when the first AS number is not the $1^{st}$ element in the AS_PATH attribute and no BGP session is established between the neighboring autonomous system and an autonomous system corresponding to a third AS number, determine that the BGP route is abnormal, where the third AS number is an element in the AS_PATH attribute that neighbors to the first AS number.

Optionally, the BGP route includes a first Internet protocol IP prefix, and the identification module is specifically configured to: when the first AS number is not the $1^{st}$ element in the AS_PATH attribute, a BGP session is established between the neighboring autonomous system and a left AS, a BGP session is established between the neighboring autonomous system and a right AS, the neighboring autonomous system has received a route that includes a first IP prefix and that is from the right AS, and the neighboring autonomous system has not advertised a route including the first IP prefix to the left AS, determine that the BGP route is abnormal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

According to a fifth aspect, an embodiment of this application provides a network device, including a memory, a processor, and a computer program. The computer program is stored in the memory, and the processor runs the computer program to perform the method according to the first aspect or the method according to the second aspect.

According to a sixth aspect, an embodiment of this application provides a chip, including a memory, a processor, and a computer program. The computer program is stored in the memory, and the processor runs the computer program to perform the method according to the first aspect or the method according to the second aspect.

According to a seventh aspect, an embodiment of this application provides a storage medium. The storage medium includes a computer program; and when the computer program is executed by a processor, the method according to the first aspect or the method according to the second aspect is implemented.

According to the BGP route identification method and apparatus, and the device provided in the embodiments of this application, the network device obtains the BGP route. The BGP route includes the autonomous system path attribute AS_PATH attribute, the AS_PATH attribute includes the first autonomous system number AS number, the AS number corresponding to the autonomous system that the network device is located in or manages is the second AS number, and the first AS number is equal to the second AS number. The network device determines, based on the first AS number and the second AS number, whether the BGP route is abnormal, so that an abnormal loop route caused by a reason such as route hijacking can be found in a timely manner, thereby improving network security

BRIEF DESCRIPTION OF THE DRAWINGS

FIG. 3 is a schematic diagram of a BGP route broadcasting process according to an embodiment of this application;

FIG. 4 is a schematic flowchart of a BGP route identification method according to an embodiment of this application;

DETAILED DESCRIPTION OF ILLUSTRATIVE EMBODIMENTS

A network architecture and a service scenario that are described in the embodiments of this application are intended to describe technical solutions in the embodiments of this application, and do not constitute any limitation to the technical solutions provided in the embodiments of this application. A person of ordinary skill in the art may know that with evolution of the network architecture and emergence of new service scenarios, the technical solutions provided in the embodiments of this application are also applicable to similar technical problems.

First, concepts in the embodiments of this application are explained.

(1) Autonomous system (AS): On the Internet, an AS is a network unit that can independently determine which routing protocol is used in the system. The network unit may be a simple network or a network cluster including one or more common networks, and is an independent and manageable network unit (for example, a carrier, a university, or an enterprise). An autonomous system is also referred to as a routing domain. All routing devices in an autonomous system need to be connected to each other and run a same routing protocol. An autonomous system corresponds to a unique autonomous system number (AS number).

(2) An interior gateway protocol (IGP) is a routing protocol used within an autonomous system. An autonomous system includes a plurality of routing devices that are connected to each other. The routing devices use the IGP protocol to propagate routes.

(3) A border gateway protocol (BGP) is a protocol used to propagate routes between different autonomous systems. BGP sessions are established between routing devices that serve as BGP speakers in the different autonomous systems to propagate routes. For example, most network carriers in China implement multi-line interconnection by using the BGP protocol and their own AS numbers. After the BGP protocol is used for interconnection, all backbone routing devices of the network carriers determine an optimal route to an Internet data center (IDC), to ensure high-speed access of users of the different network carriers.

Figure 1:
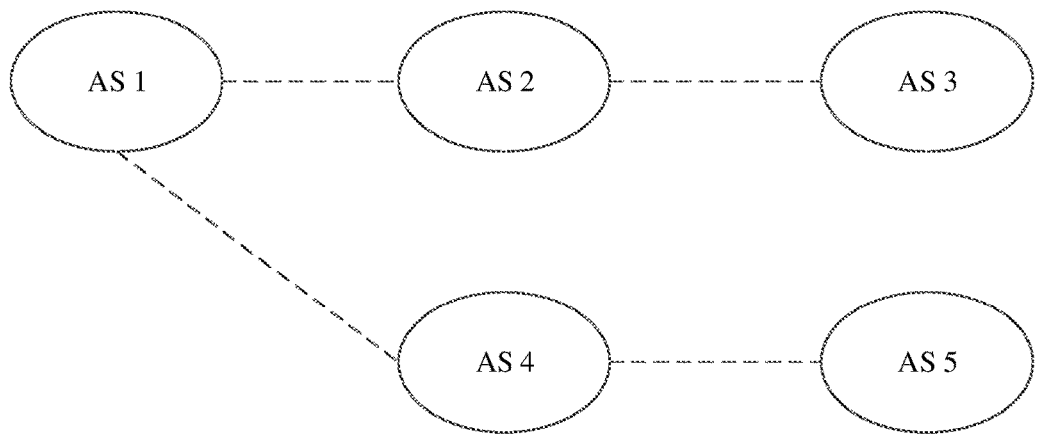
FIG. 1 is a first schematic diagram of a network architecture to which this application is applicable.

FIG. 1 is a first schematic diagram of a network architecture to which this application is applicable. The network architecture includes at least two ASes. For example, FIG. 1 shows a scenario in which five ASes are included. The border gateway protocol (BGP) is used when BGP routes are propagated between the different ASes. In FIG. 1, connections between the different ASes indicate BGP sessions. Two ASes connected by a BGP session may be referred to as neighboring ASes. For example, in FIG. 1, an AS 1 and an AS 2 are neighboring ASes, the AS 2 and an AS 3 are neighboring ASes, the AS 1 and an AS 4 are neighboring ASes, and the AS 4 and an AS 5 are neighboring ASes.

Figure 2:
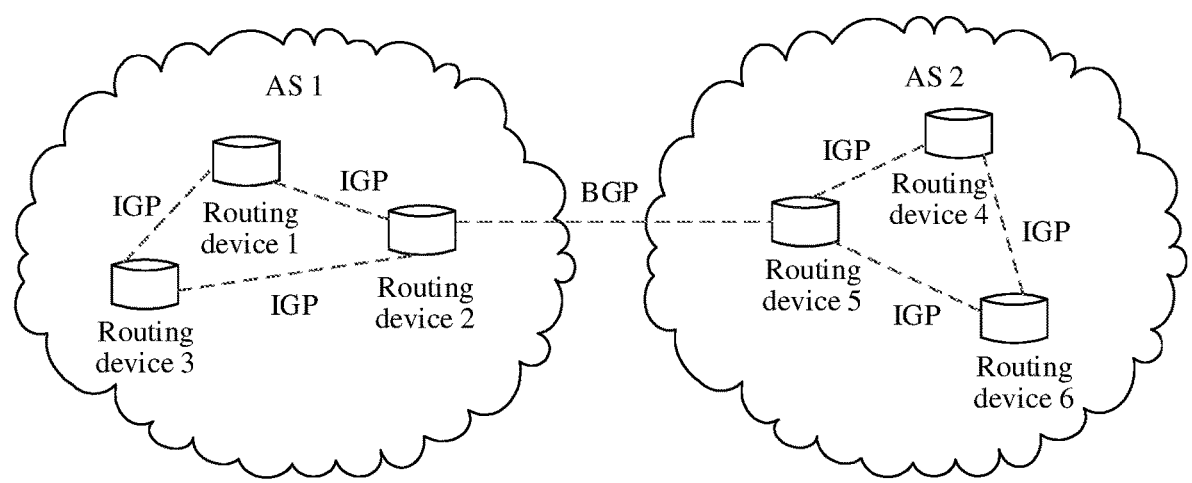
FIG. 2 is a second schematic diagram of a network architecture to which this application is applicable.

FIG. 2 is a second schematic diagram of a network architecture to which this application is applicable. FIG. 2 shows an example scenario in which the network architecture includes an AS 1 and an AS 2. As shown in FIG. 2, each AS may include a plurality of routing devices, and the routing devices in the AS are connected through IGP sessions. In each AS, a routing device that is responsible for propagating BGP route to another AS is referred to as a BGP speaker. As shown in FIG. 2, a routing device 2 in the AS 1 is a BGP speaker, and a routing device 5 in the AS 2 is a BGP speaker.

Respective BGP speakers in two ASes connected through a BGP session are BGP peers. For example, in FIG. 2, the routing device 2 and the routing device 5 are BGP peers. For example, when the AS 1 sends a BGP route to the AS 2, a BGP session needs to be established between the routing device 2 and the routing device 5, so that the routing device 2 sends the BGP route to the routing device 5 through the BGP session.

FIG. 1 and FIG. 2 are merely examples for description, and do not constitute any limitation. The network architecture may further include more autonomous systems and more routing devices. In addition, the routing device may be any device having a routing function, including but not limited to a router, a switch, or the like. In addition, in addition to a routing device, each AS may further include another device such as a controller or a server.

FIG. 3 is a schematic diagram of a BGP route propagation process according to an embodiment of this application. As shown in FIG. 3, for example, a network includes four ASes: an AS 100, an AS 200, an AS 300, and an AS 500. A BGP session is established between the AS 500 and the AS 200, a BGP session is established between the AS 200 and the AS 100, and a BGP session is established between the AS 100 and the AS 300.

In a process of propagating a BGP route, an autonomous system that originates the BGP route is referred to as an origin AS, and an autonomous system that forwards the BGP route is referred to as a transit AS. For example, a BGP speaker in the origin AS originates a BGP route. The BGP route may carry an origin attribute generated by the BGP speaker. The origin attribute is a well-known mandatory attribute. For details about the origin attribute, refer to path attributes (Path Attributes) defined in RFC 4271 released by the IETF.

For example, FIG. 3 shows two BGP routes. A first BGP route is propagated from the AS 100 to the AS 200 and then to the AS 500. For this BGP route, the AS 100 is referred to as an origin AS, and the AS 200 and the AS 500 are referred to as transit ASes. A second BGP route is propagated from the AS 100 to the AS 300. For this BGP route, the AS 100 is referred to as an origin AS, and the AS 300 is referred to as a transit AS.

A BGP route propagated between different autonomous systems includes an Internet protocol (IP) prefix and an autonomous system path attribute (AS_PATH attribute).

The IP prefix indicates a set of network addresses advertised by the origin AS corresponding to the BGP route. In this embodiment of this application, unless otherwise specified, an IP prefix is expressed by using an IP address plus a mask, that is, A.B.C.D/X.

A.B.C.D represents an IP address, and X represents a mask. For example, 10.10.0.0/16 represents all network addresses from 10.10.10.0.0 to 10.10.255.255. 10.10.10.0/24 represents all network addresses from 10.10.10.0 to 10.10.10.255.

The AS_PATH attribute includes autonomous system numbers (AS number) corresponding to all ASes that the BGP route passes through. The AS numbers recorded in the AS_PATH attribute are arranged in a sequence of autonomous systems that are from a local autonomous system to the origin autonomous system (Origin AS). The rightmost AS number in the AS_PATH attribute represents a number of the origin AS corresponding to the BGP route, and a remaining AS number represents a number of a transit AS corresponding to the BGP route. For example, if the AS_PATH attribute of a specific BGP route is 100, 200, and 300, it indicates that the BGP route is originated by the AS 300 and then forwarded by the AS 200 and the AS 100 sequentially.

It may be understood that, when the origin AS advertises a BGP route, an IP prefix and an AS_PATH attribute are carried in the BGP route. The IP prefix indicates a set of network addresses supported by the BGP route, and the AS_PATH attribute indicates ASes that the BGP route needs to sequentially pass through to reach the origin AS. After receiving the BGP route, another AS in the network may learn of a set of network addresses of the origin AS corresponding to the BGP route, and obtain ASes that the BGP route needs to pass through to reach the origin AS. When the another AS needs to send packets to the addresses in the set of network addresses, the packets are transferred on the BGP route.

The following describes a BGP route propagation process with reference to FIG. 3. It is assumed that the AS 100 needs to advertise a BGP route to another AS based on a service requirement of the AS 100. An IP prefix included in the BGP route is 207.126.0.0/16. The AS 100 adds an AS number corresponding to the local autonomous system to the AS_PATH attribute, and sends the BGP route to a neighboring AS of the AS 100 through an update message. As shown in FIG. 3, the AS 100 sends a BGP route to the AS 200 and the AS 300. Table 1 shows content of the BGP route.

TABLE 1

| IP prefix | 207.126.0.0/16 |
|---|---|
| AS_PATH attribute | 100 |

Still refer to FIG. 3. After receiving the BGP route, the AS 200 learns of the BGP route, adds an AS number corresponding to the local autonomous system to the forefront (leftmost) of the AS_PATH attribute, and sends the BGP route to the neighboring AS 500 of the AS 200. Table 2 shows content of a BGP route sent by the AS 200 to the AS 500. It may be understood that a processing process performed after the AS 300 receives the BGP route sent by the AS 100 is similar to that of the AS 200, and details are not described herein again.

TABLE 2

| IP prefix | 207.126.0.0/16 |
|---|---|
| AS_PATH attribute | 200, 100 |

After receiving the BGP route sent by the AS 200, the AS 500 learns of the BGP route, adds an AS number corresponding to the local autonomous system to the forefront (leftmost) of the AS_PATH attribute, and sends the BGP route to a neighboring autonomous system of the AS 500. Table 3 shows content of a BGP route sent by the AS 500.

TABLE 3

| IP prefix | 207.126.0.0/16 |
|---|---|
| AS_PATH attribute | 500, 200, 100 |

It can be learned from FIG. 3 that, after receiving a BGP route, each autonomous system can learn of ASes that the BGP route sequentially passes through from the local autonomous system to the AS 100 based on an AS_PATH attribute in the BGP route. That is, the AS 100 can be reached in a sequence of the AS numbers from left to right in the AS_PATH attribute.

A loop may occur when the BGP route is propagated in the network. For example, after the AS 100 advertises a BGP route, the BGP route is forwarded by another AS to the AS 100. Alternatively, after the AS 100 advertises a BGP route, the BGP route is forwarded by the AS 200 to the AS 300, and then forwarded by one or more ASes to the AS 200 or the AS 300. To avoid a loop in a BGP route propagation process, loop detection needs to be performed in the BGP route propagation process.

In a technology, after an autonomous system serving as a receiver receives a BGP route, the autonomous system detects an AS_PATH attribute in the BGP route. If the AS_PATH attribute includes an AS number corresponding to the local autonomous system, it is considered that a loop occurs. In this case, the BGP route is discarded or ignored to avoid a loop.

In another technology, if a split-horizon function is enabled between autonomous systems, an autonomous system serving as a sender detects a to-be-sent BGP route before sending the BGP route to a receiving autonomous system. If the AS_PATH attribute includes an AS number corresponding to the receiving autonomous system, it is considered that a loop occurs. In this case, the BGP route is discarded or ignored to avoid a loop after the BGP route is sent to the receiving AS.

However, BGP route forgery often occurs on a current network on which a BGP is deployed. Specifically, after hijacking the BGP route, a route hijacker tampers with an IP prefix or AS_PATH attribute in the BGP route to generate a forged BGP route.

The route hijacker may have the following purposes:
1. The route hijacker attempts to make the forged route seem like a route advertised by some ASes or a route that has passed through some ASes in a propagation process, so that the route seems like a normal route. This prevents others from being alerted.
2. The route hijacker adds AS numbers of some autonomous systems to the AS_PATH attribute of the BGP route, to prevent these ASes using these AS numbers from receiving the BGP route. For example, after the AS_PATH attribute of the BGP route includes the AS 500, when the AS 500 receives the route, it is considered that a routing loop occurs and the route is discarded. It can be learned that the route hijacker just takes advantage of a feature of loop detection processing in existing BGP protocol processing.

The following describes, with reference specific examples, impact of route hijacking on network security in the foregoing two technologies.

It is assumed that a network includes six ASes: an AS 100, an AS 200, an AS 300, an AS 400, an AS 500, and an AS 600. An origin AS corresponding to a specific BGP route is the AS 600, and an origin IP prefix is 10.10.0.0/16. After being originated by the AS 600, the BGP route passes through the AS 500 and the AS 400 and then is propagated to the AS 300. Then, the AS 300 propagates the BGP route to the AS 200. In a normal case, Table 4 shows content of the BGP route sent by the AS 300 to the AS 200.

TABLE 4

| IP prefix | 10.10.0.0/16 |
|---|---|
| AS_PATH attribute | 300, 400, 500, 600 |

In a possible route forgery scenario, after the BGP route is propagated to the AS 300, a route hijacker of the AS 300 tampers with an AS_PATH attribute of the route. Table 5 shows content of the tampered BGP route. The AS 200 receives the tampered BGP route. In this scenario, the AS 300 forges the AS 200 as an origin AS corresponding to the BGP route. As a result, the BGP route seems to be originated by the AS 200.

TABLE 5

| IP prefix | 10.10.0.0/16 |
|---|---|
| AS_PATH attribute | 300, 200 |

In another possible route forgery scenario, after the BGP route is propagated to the AS 300, a route hijacker of the AS 300 tampers with an AS_PATH attribute of the route. Table 6 shows content of the tampered BGP route. The AS 200 receives the tampered BGP route. In this scenario, the AS 300 forges the AS 200 as a transit AS corresponding to the BGP route. As a result, the BGP route seems to be forwarded by the AS 200.

TABLE 6

| IP prefix | 10.10.0.0/16 |
|---|---|
| AS_PATH attribute | 300, 200, 600 |

It should be noted that, in an actual application, there may be other possible route forgery scenarios, which are not listed one by one in this embodiment. The foregoing two route forgery scenarios are merely examples for description.

Based on the foregoing first technology, when receiving the forged route shown in Table 5 or Table 6, the AS 200 may perform loop detection. In a loop detection process, the AS 200 detects that the AS_PATH attribute includes an AS number (200) of the local autonomous system. Therefore, it is considered that the BGP route is a loop route, and the AS 200 directly discards or ignores the BGP route. Actually, for the data shown in Table 5, the AS 200 does not originate the BGP route. For the data shown in Table 6, the AS 200 has not forwarded the BGP route. That is, a loop in this scenario is not a normal loop, but a loop caused by forgery of the route hijacker.

Based on the foregoing second technology, it is assumed that the AS 300 uses the route shown in Table 5 or Table 6 as a to-be-sent BGP route. Before sending the route to the AS 200, the AS 300 performs loop detection. In a loop detection process, the AS 300 detects that the AS_PATH attribute includes an AS number (200) of the receiving AS 200. In this case, it is considered that a loop occurs after the BGP route is sent to the AS 200. Therefore, the AS 300 directly discards or ignores the BGP route. Actually, for the data shown in Table 5, the AS 200 actually does not originate the BGP route. For the data shown in Table 6, the AS 200 has not forwarded the BGP route. That is, a loop in this scenario is not a normal loop, but a loop caused by forgery of a route hijacker.

It can be learned that, in the foregoing two technologies, when a network device in an autonomous system detects a routing loop, the BGP route is directly discarded or ignored. As a result, route hijacking cannot be found in a timely manner, causing network security risks.

To resolve the foregoing technical problem, an embodiment of this application provides a BGP route identification method. When a loop occurs in a BGP route, whether the BGP route is abnormal can be further identified. For example, whether a route exception is caused by a forged route or a protocol configuration error is identified. In this way, abnormal route propagation in a network can be found in a timely manner, thereby improving network security.

FIG. 4 is a schematic flowchart of a BGP route identification method according to an embodiment of this application. Specifically, as shown in FIG. 4, the method in this embodiment includes S401 and S402.

S401: A network device obtains a BGP route, where the BGP route includes an autonomous system path attribute AS_PATH attribute, the AS_PATH attribute includes a first autonomous system number AS number, an AS number corresponding to an autonomous system that the network device is located in or manages is a second AS number, and the first AS number is equal to the second AS number.

In this embodiment, the network device may be any network device in the autonomous system. For example, the network device may be a routing device in an autonomous system, for example, a routing device serving as a BGP speaker. In addition, the network device may alternatively be a network device that manages the autonomous system. For example, the network device may be a controller or a server configured to control and monitor each routing device in the autonomous system.

In this embodiment, the autonomous system that the network device is located in or manages is an autonomous system serving as a receiver in a BGP route propagation process. For ease of description, in this embodiment, the autonomous system that the network device is located in or manages is referred to as a local autonomous system. An autonomous system serving as a sender in a BGP route propagation process is referred to as a sending autonomous system.

Figure 5:
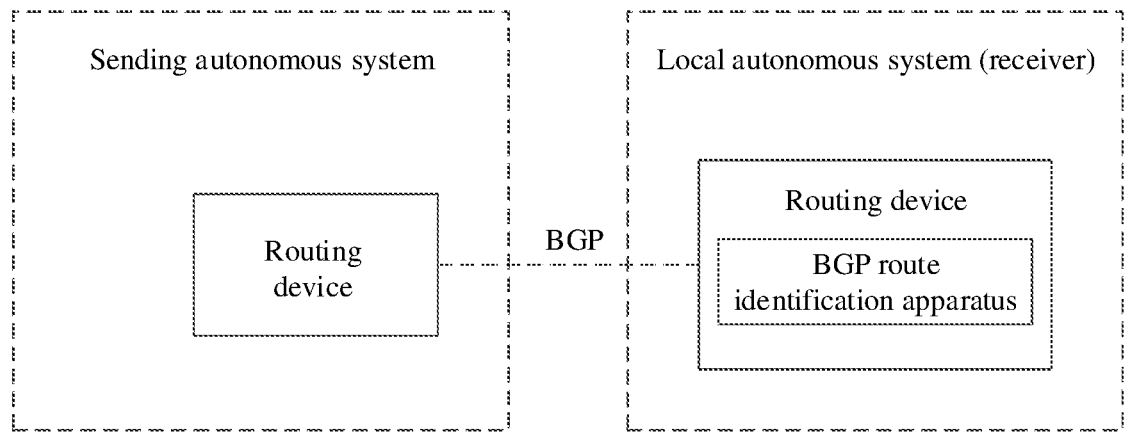
FIG. 5 is a first schematic diagram of an application scenario according to an embodiment of this application.

In a first possible application scenario, the network device is a routing device serving as a BGP speaker in the local autonomous system. FIG. 5 is a first schematic diagram of an application scenario according to this embodiment of this application. As shown in FIG. 5, a BGP route identification apparatus is disposed on a routing device in the local autonomous system, to perform the method in this embodiment.

In this scenario, that a network device obtains a BGP route in S401 includes: The routing device receives the BGP route. Specifically, the routing device receives the BGP route sent by the BGP speaker in the sending autonomous system.

Figure 6:
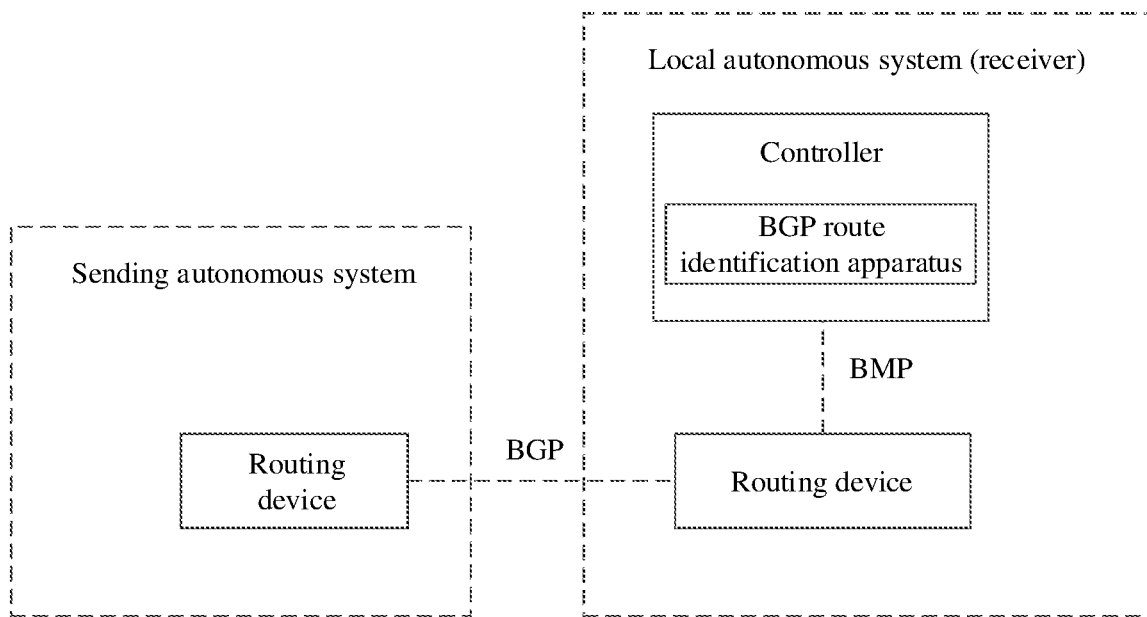
FIG. 6 is a second schematic diagram of an application scenario according to an embodiment of this application.

In a second possible application scenario, the network device is a controller that manages the local autonomous system. FIG. 6 is a second schematic diagram of an application scenario according to this embodiment of this application. As shown in FIG. 6, a BGP route identification apparatus is disposed on the controller that manages the local autonomous system, to perform the method in this embodiment.

In this scenario, that a network device obtains a BGP route in S401 includes: The controller receives the BGP route sent by a routing device. Specifically, after receiving the BGP route from a BGP speaker in the sending autonomous system, the routing device (for example, a BGP speaker) in the local autonomous system forwards the BGP route to the controller.

For each autonomous system, the controller is connected to the routing device in the autonomous system according to a BGP monitoring protocol (BMP). The controller is configured to monitor a BGP route receiving status of the routing device. To support this embodiment, the BMP protocol needs to be extended. Currently, RFC 7854 of the BMP protocol supports seven message types: the following type 0 to type 6. In this embodiment, a new message type is added, that is, the following Type=TBD1: Diagnosis Message. The message is used to collect diagnosis information of all routing devices.

Type=0: Route Monitoring
Type=1: Statistics Report
Type=2: Peer Down Notification
Type=3: Peer Up Notification Type=4: Initiation Message Type=5: Termination Message Type=6: Route Mirroring Message Type=TBD1: Diagnosis Message Specifically, a BMP session is established between the BGP speaker and the controller in the local autonomous system. A BGP session is established between the BGP speaker in the local autonomous system and the BGP speaker in the sending autonomous system. After receiving BGP route information, the BGP speaker in the local autonomous system encapsulates the BGP route information into the newly added diagnosis message. The diagnosis message is then forwarded to the controller. The controller parses the diagnosis message to obtain the BGP route, and performs a subsequent BGP route identification process.

In this embodiment, the BGP route obtained by the network device includes an autonomous system path attribute AS_PATH attribute, where the AS_PATH attribute may include one or more autonomous system numbers (AS number). In the application scenario corresponding to this embodiment, the AS_PATH attribute includes an AS number that is the same as an autonomous system number corresponding to the local autonomous system. For ease of description, in this embodiment, the AS number corresponding to the local autonomous system is referred to as a second AS number, and the AS number in the AS_PATH attribute that is the same as the second AS number is referred to as a first AS number. That is, the first AS number is equal to the second AS number.

Certainly, in addition to the AS_PATH attribute, the BGP route may further include other information, for example, an IP prefix. The IP prefix may be carried in a network layer reachability information (NLRI) field. The NLRI field may be carried in a BGP update message. In this application, the IP prefix may also be referred to as an IP address prefix.

An example is used below for description. It is assumed that a network includes four autonomous systems: an AS 100, an AS 200, an AS 300, and an AS 400. After a BGP route is originated from the AS 100, passes through the AS 200 and the AS 300, and is forwarded to the AS 400, content of the BGP route received by the AS 400 is shown in Table 7.

TABLE 7

| IP prefix | 10.10.0.0/16 |
|---|---|
| AS_PATH attribute | 300, 200, 100 |

The network device obtains the BGP route. Because the AS_PATH attribute does not include an AS number (400) corresponding to the local autonomous system, processing may be performed based on an existing route propagation process. For example, the AS number (400) of the local autonomous system is added to the forefront (leftmost) of the AS_PATH attribute, and the BGP route is propagated to a neighboring autonomous system of the AS 400. In this application, the AS 400 is an AS whose AS number is 400.

It is assumed that the BGP route received by the AS 400 is shown in Table 8 or Table 9. Because the AS_PATH attribute includes the AS number (400) of the local autonomous system, step S402 is performed to determine whether the BGP route is abnormal.

TABLE 8

| IP prefix | 10.10.0.0/16 |
|---|---|
| AS_PATH attribute | 300, 400 |

TABLE 9

| IP prefix | 10.10.0.0/16 |
|---|---|
| AS_PATH attribute | 300, 400, 100 |

S402: The network device determines, based on the first AS number and the second AS number, whether the BGP route is abnormal.

In this embodiment, an exception may be that the BGP route is forged. In addition, the exception may be a BGP route exception caused by a protocol configuration error.

BGP route forgery may be specifically that a route hijacker tampers with a BGP route. For example, after hijacking the BGP route, the route hijacker tampers with an IP prefix and/or an AS_PATH attribute in the BGP route so that the tampered BGP route seems to be originated by a specific AS or forwarded by some ASes.

The BGP route exception caused by the protocol configuration error means that, due to a configuration error of a specific autonomous system, a BGP route is propagated to an autonomous system that should not receive the BGP route. For example, the AS 1 advertises a BGP route to the AS 2, and indicates, in a community attribute of the BGP route, that the BGP route is dedicated to the AS 2. For example, the BGP route received by the AS 2 carries an NO_EXPORT communities attribute (NO_EXPORT communities attribute). A value of the NO_EXPORT communities attribute may be 0xFFFFFF01. If a protocol configuration of the AS 2 is correct, the AS 2 can determine, based on the NO_EXPORT communities attribute, that the BGP route is dedicated to the AS 2. The AS 2 forwards the BGP route to the AS 3 because of a protocol configuration error of the AS 2. In this scenario, the AS 3 should not receive the BGP route. In another scenario, the AS 2 forwards the BGP route to another AS. The another AS forwards the BGP route to the AS 1. In this scenario, the another AS and the AS 1 should not receive the BGP route. In this embodiment, the BGP route corresponding to this case is referred to as the "BGP route exception caused by the protocol configuration error".

In this embodiment, in the BGP route obtained by the network device, when the AS_PATH attribute includes the first AS number that is equal to the AS number corresponding to the local autonomous system, it is determined that the BGP route is abnormal. When the AS_PATH attribute does not include the first AS number that is equal to the AS number corresponding to the local autonomous system, it is determined that the BGP route is normal.

In a possible implementation, the network device determines, based on the first AS number, the second AS number, and a position of the first AS number in the AS_PATH attribute, whether the BGP route is abnormal.

In this embodiment, when the AS_PATH attribute in the BGP route obtained by the network device includes the first AS number that is equal to the AS number corresponding to the local autonomous system, whether the BGP route is abnormal may be further determined based on the position of the first AS number in the AS_PATH attribute.

The AS_PATH attribute may include one or more AS numbers. Each AS number may be referred to as an element of the AS_PATH attribute. In this embodiment, the position of the first AS number in the AS_PATH attribute indicates an element number of the first AS number in the AS_PATH attribute.

It may be understood that the first AS number is equal to the second AS number corresponding to the local autonomous system. When the first AS number is the $1^{st}$ element in the AS_PATH attribute, it indicates that the local AS is an origin AS corresponding to the BGP route. When the first AS number is not the $1^{st}$ element in the AS_PATH attribute, it indicates that the local autonomous system is a transit AS corresponding to the BGP route.

The $1^{st}$ element is an element located in the rightmost position of the AS_PATH attribute.

After it is determined, based on the position of the first AS number in the AS_PATH attribute, that the local autonomous system is the origin AS or transit AS corresponding to the BGP route, whether the BGP route is abnormal may be further determined based on the AS_PATH attribute.

In a possible implementation, if the first AS number is the $1^{st}$ element in the AS_PATH attribute, it indicates that the local autonomous system is the origin AS corresponding to the BGP route. An AS number in the AS_PATH attribute that left neighbors to the first AS number may be determined. Whether the BGP route is forged can be determined by determining whether a BGP session is established between the local autonomous system and an autonomous system corresponding to the AS number that left neighbors to the first AS number. For example, if no BGP session is established between the local autonomous system and the autonomous system corresponding to the AS number that left neighbors to the first AS number, it indicates that the BGP route is forged.

In another possible implementation, if the first AS number is not the $1^{st}$ element in the AS_PATH attribute, it indicates that the local autonomous system is a transit AS corresponding to the BGP route. An AS number that left neighbors to the first AS number in the AS_PATH attribute and an AS number that right neighbors to the first AS number in the AS_PATH attribute may be determined. Whether the BGP route is forged is determined by determining whether the autonomous system corresponding to the AS number that left neighbors to the first AS number and an autonomous system corresponding to the AS number that right neighbors to the first AS number establish a BGP session with the local autonomous system. For example, if at least one of the autonomous system corresponding to the AS number that left neighbors to the first AS number and the autonomous system corresponding to the AS number that right neighbors to the first AS number does not establish a BGP session with the local autonomous system, it indicates that the BGP route is forged.

In a specific implementation process, an actual connection relationship between autonomous systems in a network may be stored in a database of the local autonomous system, that is, a BGP session connection relationship is established between the autonomous systems. When receiving the BGP route shown in Table 8 or Table 9, the network device may determine, based on the AS_PATH attribute in the BGP route and the actual connection relationship between autonomous systems stored in the database, whether the BGP route is forged.

It should be noted that the database in this embodiment may be a database on the routing device disposed in the local autonomous system, may be a database on another network device disposed in the local autonomous system, or may be a database on the controller or server that manages the local autonomous system. This is not specifically limited in this embodiment.

In a possible implementation, a global controller is disposed in the network. The global controller is connected to each autonomous system in the network, and is configured to obtain, from each autonomous system, route information and information about a connection relationship between the autonomous systems. In addition, the global controller is further configured to synchronize the collected information to local databases of the autonomous systems. In this way, each autonomous system can query a local database for route information of the autonomous system and the information about the connection relationship between autonomous systems.

Further, when the BGP route further includes an IP prefix, whether the BGP route is abnormal may be further determined with reference to the IP prefix. The following provides description with reference to specific implementations.

In a possible implementation, the BGP route includes a first Internet protocol IP prefix. When the first AS number is the $1^{st}$ element in the AS_PATH attribute and the network device has not advertised a route including the first IP prefix, the network device determines that the BGP route is abnormal.

In other words, if the AS number corresponding to the local autonomous system is the $1^{st}$ element in the AS_PATH attribute, and the local autonomous system has not advertised a route including the first IP prefix, it is determined that the BGP route is abnormal.

In this application, "advertise" includes "originate (originated) and advertise" and "receive and advertise". "originate (originated) and advertise" means that the autonomous system originates a BGP route and advertises the BGP route to another AS. "receive and advertise" means that the autonomous system receives a BGP route from another AS and advertises the route to another AS. In this embodiment, "originate and advertise" may be referred to as "originate", and "receive and advertise" may be referred to as "forward".

That "the network device has not advertised a route including the first IP prefix" may be specifically that the network device has not advertised a route including an IP prefix before performing S402. That "the network device has not advertised a route including the first IP prefix" may be specifically implemented in a first case or a second case. In the first case, the network device has not originated or advertised the route including the first IP prefix. For example, the network device does not generate the route including the first IP prefix. A database of the network device does not record the route including the first IP prefix. In the second case, the network device has not received or advertised the route including the first IP prefix. For example, the network device has not received a route including the first IP prefix from another AS, or has not advertised a route including the first IP prefix to another AS.

In a specific implementation process, a database of the local autonomous system is used to record at least one second IP prefix advertised by the local autonomous system. When the first IP prefix in the BGP route does not match any second IP prefix, it is determined that the BGP route is abnormal.

It should be noted that the foregoing match is a complete match, that is, a complete match between IP addresses and a complete match between masks.

For example, it is assumed that the database of the local autonomous system records that the local autonomous system has advertised two IP prefixes: 10.1.0.0/16 and 10.2.0.0/16.

In a case, in the BGP route obtained by the routing device, an AS number corresponding to the local autonomous system is the $1^{st}$ element in the AS_PATH attribute, and an IP prefix in the BGP route is 10.3.0.0/16. In this case, when the network device identifies the BGP route, because the IP prefix (10.3.0.0/16) in the BGP route does not match either of the two IP prefixes (10.1.0.0/16 and 10.2.0.0/16) recorded in the database, the network device determines that the BGP route is forged.

In another case, in the BGP route obtained by the routing device, an AS number corresponding to the local autonomous system is the $1^{st}$ element in the AS_PATH attribute, and an IP prefix in the BGP route is 10.2.1.0/24. In this case, when the network device identifies the BGP route, because the IP prefix (10.2.1.0/24) in the BGP route does not match either of the two IP prefixes (10.1.0.0/16 and 10.2.0.0/16) recorded in the database, the network device determines that the BGP route is forged.

A scenario corresponding to this implementation is: The AS number corresponding to the local autonomous system is the $1^{st}$ element in the AS_PATH attribute, but the local autonomous system has not advertised a route including the first IP prefix. In this scenario, it indicates that the hijacker forges the IP prefix or the AS_PATH attribute of the BGP route. As a result, the forged route seems like that the IP prefix is advertised by the local autonomous system. This case is completely a route forgery event, and this type of route forgery may be referred to as an exception type 1.

In another possible implementation, the BGP route includes a first Internet protocol IP prefix. When the first AS number is the $1^{st}$ element in the AS_PATH attribute, the network device has advertised a route including a second IP prefix, and the network device has not advertised a route including the first IP prefix, the network device determines that the BGP route is abnormal. The first IP prefix is a subprefix of the second IP prefix.

In this application, that the network device has advertised a route including a second IP prefix may be that the network device has advertised the route including the second IP prefix before performing S402.

Another expression manner is as follows: If the AS number corresponding to the local autonomous system is the $1^{st}$ element in the AS_PATH attribute, and the first IP prefix is a subprefix of a specific second IP prefix that has been advertised by the local autonomous system, but the local autonomous system has not advertised the first IP prefix, it is determined that the BGP route is abnormal.

In this embodiment, that "the first IP prefix is a subprefix of the second IP prefix" means that a network address set indicated by the first IP prefix is a subset of a network address set indicated by the second IP prefix, and that the network address set indicated by the first IP prefix is not equal to the network address set indicated by the second IP prefix. For example, it is assumed that the first IP prefix is 10.10.192.0/24, and the second IP prefix is 10.10.128.0/17. Because the network address set corresponding to the first IP prefix is network addresses from 10.10.192.0 to 10.10.192.255, the network address set corresponding to the second IP prefix is network addresses from 10.10.128.0 to 10.10.255.255, and the network address set corresponding to the first IP prefix is a subset of the network address set corresponding to the second IP prefix. Therefore, it is considered that the first IP prefix is a subprefix of the second IP prefix.

A scenario corresponding to this implementation is: The AS number corresponding to the local autonomous system is the $1^{st}$ element in the AS_PATH attribute, and the first IP prefix is a subprefix of a specific second IP prefix that has been advertised by the local autonomous system, but the local autonomous system has not advertised the first IP prefix. In this scenario, it indicates that the hijacker forges the IP prefix or the AS_PATH attribute of the BGP route. As a result, the forged route seems like a subprefix of a specific IP prefix that has been advertised by the local autonomous system. This case is completely a route forgery event, and this type of route forgery is referred to as an exception type 2.

In still another possible implementation, when the first AS number is the $1^{st}$ element in the AS_PATH attribute and the network device has advertised a route including the first IP prefix to an autonomous system corresponding to an element in the AS_PATH attribute that neighbors to the first AS number, the network device determines that the BGP route is normal.

For example, it is assumed that the database of the local autonomous system records that the AS 100 has advertised, to the AS 200, a BGP route whose IP prefix is 10.10.10.0/24. If the IP prefix of the BGP route received by the network device is 10.10.10.0/24, and the AS_PATH attribute is 300, 200, and 100, it is determined that the BGP route is normal.

In this embodiment, when it is determined that the BGP route is normal, it indicates that a loop type of the BGP route is a normal loop, and the BGP route may be discarded or ignored in a processing manner in a conventional technology, to avoid a routing loop.

In still another possible implementation, the BGP route includes a first Internet protocol IP prefix. When the first AS number is the $1^{st}$ element in the AS_PATH attribute, the network device has advertised, to a specific AS, a route that is dedicated to the specific AS and that includes the first IP prefix, and the AS_PATH attribute includes a third AS number or does not include the second AS number, the network device determines that the BGP route is abnormal.

The third AS number is not equal to the first AS number, and is not equal to the second AS number.

In this application, that the network device has advertised, to a specific AS, a route that is dedicated to the specific AS and that includes the first IP prefix may be: Before performing S402, the network device has advertised the route that is dedicated to the specific AS and that includes the first IP prefix.

That the network device advertises, to a specific AS, a route that is dedicated to the specific AS and that includes the first IP prefix may be specifically: When the network device advertises the route including the first IP prefix, a community attribute (community attribute) of the route indicates that the route is dedicated to the specific AS. For example, when the network device advertises the route including the first IP prefix, a NO_EXPORT communities attribute (NO_EXPORT communities attribute) is carried in the community attribute. A value of the NO_EXPORT communities attribute may be 0xFFFFFF01.

In a specific implementation process, the database of the local autonomous system is further used to record IP prefixes that have been advertised by the local autonomous system, and record information such as specific ASes to which the IP prefixes are advertised and whether the IP prefixes are dedicated to some specific ASes. After obtaining the BGP route, the network device determines, by querying the database for related information, whether the BGP route is an abnormal route.

An example is used below for description. It is assumed that the database of the local autonomous system records that the AS 100 has advertised, to the AS 200, a BGP route whose IP prefix is 10.10.10.0/24. In addition, when advertising the BGP route, the local autonomous system specifies that the route is a route dedicated to the AS 200.

In a case, after obtaining the BGP route, the AS 100 finds that content of the BGP route is shown in Table 10. The IP prefix of the BGP route is 10.10.10.0/24, and an AS_PATH attribute in the BGP route is 300, 200, and 100. During route identification, the network device in the AS 100 queries the database and finds that the AS 100 has indeed advertised, to the AS 200, the route whose prefix is 10.10.10.0/24. However, this route is dedicated to the AS 200. The BGP route received by the AS 200 is shown in Table 10. The AS 200 forwards this route to the AS 300. It indicates that after receiving the dedicated route from the AS 100, the AS 200 does not use the route according to a protocol configuration. This violates a route usage convention. In this embodiment, this type of the BGP route is referred to as an exception type 3.

TABLE 10

| IP prefix | 10.10.10.0/24 |
|---|---|
| AS_PATH attribute | 300, 200, 100 |

In another case, after obtaining the BGP route, the AS 100 finds that content of the BGP route is shown in Table 11. The IP prefix of the BGP route is 10.10.10.0/24, and the AS_PATH attribute in the BGP route is 300, 400, and 100. During route identification, a network device in the AS 100 queries the database and finds that the AS 100 has indeed advertised a route whose prefix is 10.10.10.0/24. However, this route is advertised dedicatedly to the AS 200. However, the AS_PATH attribute in the BGP route that is shown in Table 10 and that is received by the AS 100 does not include 200, it indicates that this route may be obtained by forging an AS_PATH attribute after hijacking by a hijacker. In this embodiment, this type of the BGP route is referred to as an exception type 4.

TABLE 11

| IP prefix | 10.10.10.0/24 |
|---|---|
| AS_PATH attribute | 300, 400, 100 |

In still another possible implementation, when the first AS number is the $1^{st}$ element in the AS_PATH attribute, the network device has advertised, to a specific AS, a route that is dedicated to the specific AS and that includes the first IP prefix, and the AS_PATH attribute includes the second AS number but does not include a third AS number, the network device determines that the BGP route is normal. The third AS number is not equal to the first AS number, and is not equal to the second AS number.

For example, it is assumed that the database of the local AS records that AS 100 has advertised, to the AS 200, a BGP route whose IP prefix is 10.10.10.0/24, and the route is dedicated to the AS 200. If the IP prefix of the BGP route received by the network device is 10.10.10.0/24, and the AS_PATH attribute is 200 and 100, that is, the AS_PATH attribute does not include another AS except the specific AS, it is determined that the BGP route is normal.

In this embodiment, when it is determined that the BGP route is normal, it indicates that a loop type of the BGP route is a normal loop, and the BGP route may be discarded or ignored in a processing manner in a conventional technology, to avoid a routing loop.

In still another possible implementation, when the first AS number is not the $1^{st}$ element in the AS_PATH attribute, and no BGP session is established between an autonomous system that the network device is located in or manages and an autonomous system corresponding to a fourth AS number, the network device determines that the BGP route is abnormal. The fourth AS number is an element in the AS_PATH attribute that neighbors to the first AS number.

The fourth AS number may be one AS number, or may be two AS numbers.

In other words, when no BGP session is established between the local autonomous system and an autonomous system corresponding to at least one of the one or more AS numbers in the AS_PATH attribute that neighbor to the first AS number, it is determined that the BGP route is abnormal.

In this application, that no BGP session is established between the local autonomous system and an autonomous system corresponding to the fourth AS number may be specifically: Before the network device performs S402, no BGP session is established between the local autonomous system and the autonomous system corresponding to the fourth AS number.

In a specific implementation process, a database of the local autonomous system is further used to store a connection relationship between autonomous systems, that is, store whether a BGP session is established between the autonomous systems. After obtaining the BGP route and determining, based on the AS_PATH attribute, AS numbers neighboring to the first AS number, the network device may determine, by querying the database, whether BGP sessions are established between the local autonomous system and autonomous systems corresponding to the neighboring AS numbers.

For example, it is assumed that the database of the local autonomous system AS 100 records that a BGP session is established between the AS 100 and the AS 200, and that a BGP session is also established between the AS 100 and the AS 300.

In a case, the AS_PATH attribute in the BGP route obtained by the network device is 200, 100, and 400. It can be learned, by querying the database, that no BGP session is actually established between the AS 400 and the AS 100; it is determined that the BGP route is abnormal. In this case, the fourth AS number in this embodiment is specifically 400.

In another case, the AS_PATH attribute in the BGP route obtained by the network device is 500, 100, and 400. It can be learned, by querying the database, that no BGP session is actually established between the AS 400 and the AS 100, and no BGP session is established between the AS 500 and the AS 100; it is determined that the BPG route is abnormal. In this case, the fourth AS number in this embodiment includes 400 and 500.

In a scenario corresponding to this implementation, in the BGP route obtained by the network device, an AS number corresponding to the local autonomous system is not the $1^{st}$ element in the AS_PATH attribute, and no BGP session is established between the local autonomous system and an autonomous system corresponding to at least one of elements in the AS_PATH attribute that neighbor to the AS number corresponding to the local autonomous system. In this scenario, it indicates that after hijacking the route, the hijacker tampers with the AS_PATH attribute in the route.

As a result, the tampered route seems to have passed through the local autonomous system. Therefore, this case is completely a route forgery event. In this embodiment, this type of the BGP route is referred to as an exception type 5.

In still another possible implementation, the BGP route includes a first Internet protocol IP prefix. When the first AS number is not the $1^{st}$ element in the AS_PATH attribute, a BGP session is established between a left AS and an autonomous system that the network device is located in or manages, a BGP session is established between a right AS and the autonomous system that the network device is located in or manages, and the network device has not received a route that includes the first IP prefix and that is from the right AS or the network device has not advertised a route including the first IP prefix to the left AS, the network device determines that the BGP route is abnormal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

In a specific implementation process, in addition to storing whether a BGP session is established between autonomous systems, the database of the local autonomous system is further used to store historical BGP route information forwarded by the local autonomous system. For example, the local autonomous system has received IP prefixes from specific autonomous systems and has advertised IP prefixes to specific autonomous systems. After obtaining the BGP route, the network device determines, based on the AS_PATH attribute, AS numbers neighboring to the first AS number. Then, whether BGP sessions are established between the local autonomous system and autonomous systems corresponding to the neighboring AS numbers is determined by querying the database. In addition, whether the local autonomous system has received an IP prefix in the BGP route from the autonomous systems corresponding to the neighboring AS numbers is determined, or whether the local autonomous system has advertised an IP prefix in the BGP route to the autonomous systems corresponding to the neighboring AS numbers is determined.

In the following example, the local autonomous system is the AS 100. In the BGP route obtained by a network device in the AS 100, an AS_PATH attribute is 200, 100, and 400, and an IP prefix is 10.10.10.0/24. When the network device identifies a route, the network device determines that the BPG route is abnormal, if the network device finds, by querying a database, that a BGP session is established between the AS 400 and the local autonomous system AS 100, and a BGP session is also established between the AS 200 and the local autonomous system AS 100, but the local autonomous system AS 100 has not received a route whose IP prefix is 10.10.10.0/24 from the AS 400.

Alternatively, when the network device identifies a route, the network device determines that the BPG route is abnormal, if the network device finds, by querying a database, that a BGP session is established between the AS 400 and the local autonomous system AS 100, a BGP session is also established between the AS 200 and the local autonomous system AS 100, and the local autonomous system has received a route including an IP prefix 10.10.10.0/24 from the AS 400, but the local autonomous system AS 100 has not advertised a route including the IP prefix is 10.10.10.0/24 to the AS 200.

In a scenario corresponding to this implementation, in the BGP route obtained by the network device, an AS number corresponding to the local autonomous system is not the $1^{st}$ element in the AS_PATH attribute. In addition, a BGP session is established between the local autonomous system and each of autonomous systems corresponding to a left neighboring element and a right neighboring element in elements in the AS_PATH attribute that neighbor to the AS number corresponding to the local autonomous system, but the network device has not received a route including the IP prefix from the autonomous system corresponding to the right neighboring element or has not advertised a route including the IP prefix to the autonomous system corresponding to the left neighboring element. In this scenario, it indicates that after hijacking the route, a hijacker tampers with the IP prefix or the AS_PATH attribute in the route. As a result, the tampered route seems to have passed through the local autonomous system. Therefore, this case is completely a route forgery event. In this embodiment, this type of the BGP route is referred to as an exception type 6.

In still another possible implementation, when the first AS number is not the $1^{st}$ element in the AS_PATH attribute, a BGP session is established between a left AS and an autonomous system that the network device is located in or manages, a BGP session is established between a right AS and the autonomous system that the network device is located in or manages, the network device has received a route that includes the first IP prefix and that is from the right AS, and the network device has advertised the route including the first IP prefix to the left AS, the network device determines that the BGP route is normal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

In this embodiment, when it is determined that the BGP route is normal, it indicates that a loop type of the BGP route is a normal loop, and the BGP route may be discarded or ignored in a processing manner in a conventional technology, to avoid a routing loop.

Based on the foregoing embodiments, after the network device determines that the BGP route is abnormal, the method further includes:

The network device generates log information and/or alarm information corresponding to a route exception, to notifying an autonomous system corresponding to each AS number in the AS_PATH attribute to correct the route.

Specifically, after the BGP route exception is identified, the log information corresponding to the BGP route exception may be locally generated on the network device, and the alarm information may be further reported to a network management server corresponding to a local autonomous system, so that a user can find abnormal route propagation in the network in a timely manner and correct the route in a timely manner. This improves network security and stability.

According to the BGP route identification method provided in this embodiment includes: The network device obtains the BGP route, where the BGP route includes the autonomous system path attribute AS_PATH attribute, the AS_PATH attribute includes the first autonomous system number AS number, the AS number corresponding to the autonomous system that the network device is located in or manages is the second AS number, and the first AS number is equal to the second AS number; and the network device determines, based on the first AS number and the second AS number, whether the BGP route is abnormal. In this way, an abnormal loop route caused by a reason such as route hijacking can be found in a timely manner, thereby improving network security.

Figure 7:
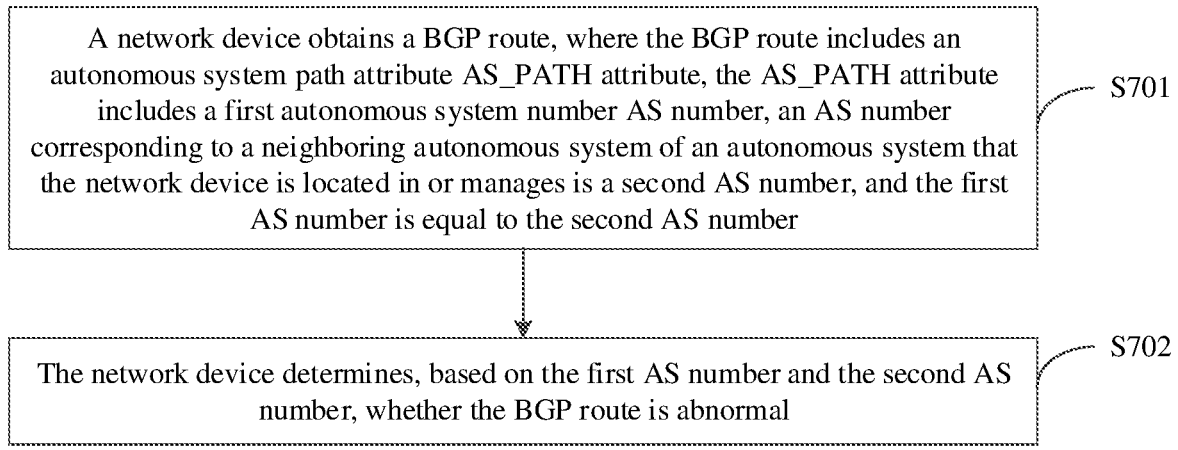
FIG. 7 is a schematic flowchart of a BGP route identification method according to another embodiment of this application.

FIG. 7 is a schematic flowchart of a BGP route identification method according to another embodiment of this application. As shown in FIG. 7, the method in this embodiment includes S701 and S702.

S701: A network device obtains a BGP route, where the BGP route includes an autonomous system path attribute AS_PATH attribute, the AS_PATH attribute includes a first autonomous system number AS number, an AS number corresponding to a neighboring autonomous system of an autonomous system that the network device is located in or manages is a second AS number, and the first AS number is equal to the second AS number.

In this embodiment, the network device may be any network device in the autonomous system. For example, the network device may be a routing device in an autonomous system, for example, a routing device serving as a BGP speaker. In addition, the network device may alternatively be a network device that manages the autonomous system. For example, the network device may be a controller or a server configured to control and monitor each routing device in the autonomous system.

In this embodiment, the autonomous system that the network device is located in or manages is an autonomous system serving as a sender in a BGP route propagation process. For ease of description, in this embodiment, the autonomous system that the network device is located in or manages is referred to as a local autonomous system. An autonomous system serving as a receiver in a BGP route propagation process is referred to as a neighboring autonomous system.

Figure 8:
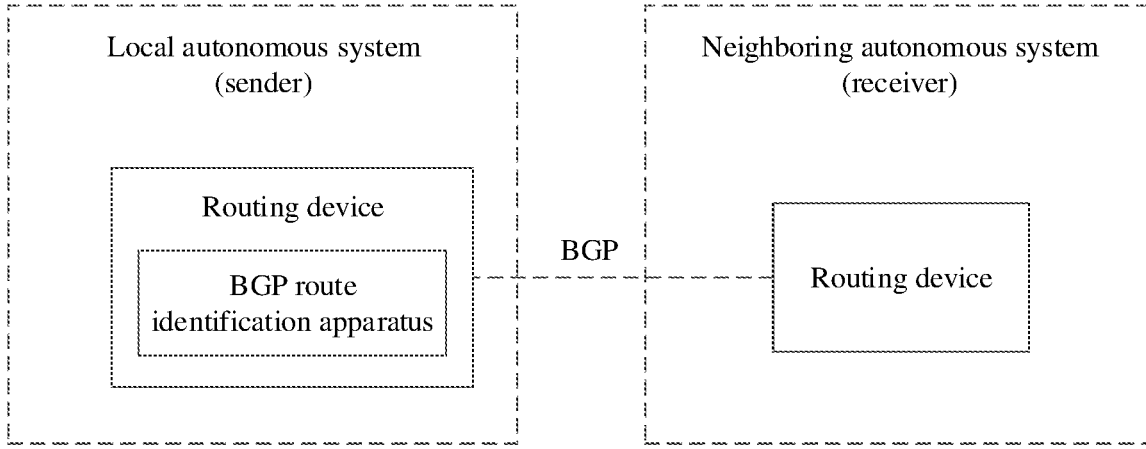
FIG. 8 is a third schematic diagram of an application scenario according to an embodiment of this application.

In a first possible application scenario, the network device is a routing device serving as a BGP speaker in the local autonomous system. FIG. 8 is a third schematic diagram of an application scenario according to this embodiment of this application. As shown in FIG. 8, a BGP route identification apparatus is disposed on a routing device in the local autonomous system, to perform the method in this embodiment.

In this scenario, that a network device obtains a BGP route in S701 includes: A routing device generates the BGP route. The generating the BGP route is specifically generating a to-be-sent BGP route. Specifically, when the local autonomous system is an origin AS, the routing device generates the to-be-sent BGP route based on a to-be-advertised IP prefix and an AS number corresponding to the local autonomous system. When the local autonomous system is a transit AS, the routing device adds an AS number corresponding to the local autonomous system, to an AS_PATH attribute of a BGP route received from a previous neighboring autonomous system to generate a to-be-sent BGP route.

Figure 9:
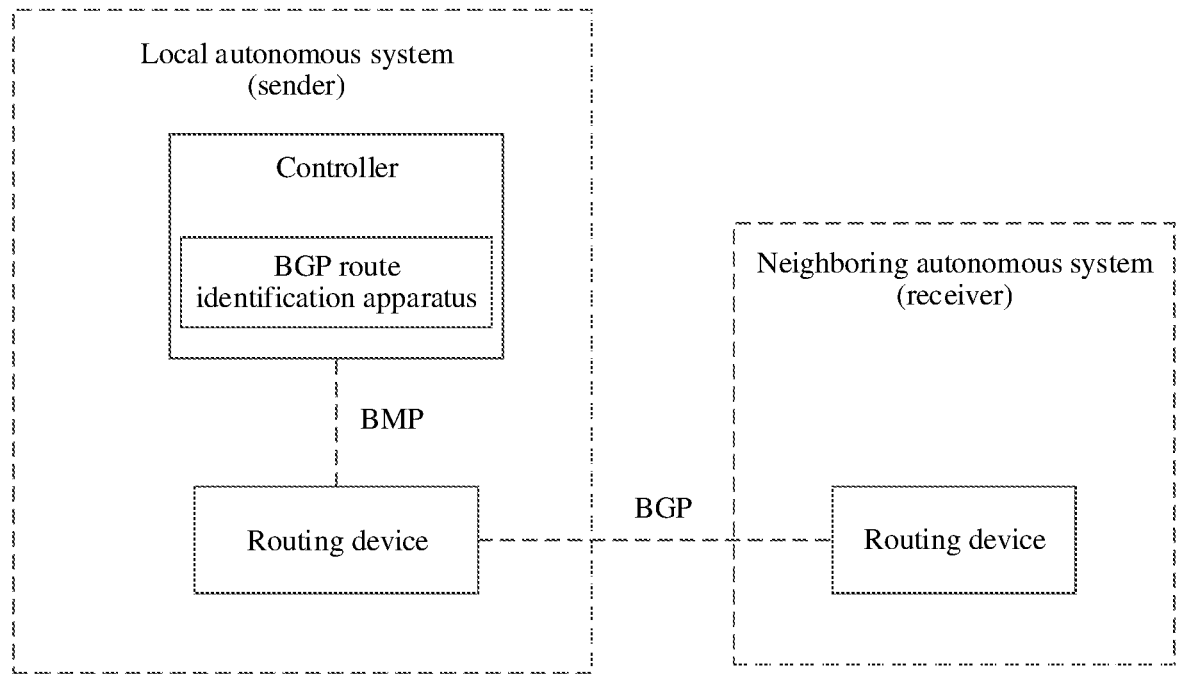
FIG. 9 is a fourth schematic diagram of an application scenario according to an embodiment of this application.

In a second possible application scenario, the network device is a controller that manages the local autonomous system. FIG. 9 is a fourth schematic diagram of an application scenario according to this embodiment of this application. As shown in FIG. 9, a BGP route identification apparatus is disposed on the controller that manages the local autonomous system, to perform the method in this embodiment.

In this scenario, that a network device obtains a BGP route in S701 includes: The controller receives the BGP route sent by a routing device. Specifically, after generating a to-be-sent BGP route, the routing device (for example, a BGP speaker) in the local autonomous system forwards the BGP route to the controller.

For each autonomous system, the controller is connected to the routing device in the autonomous system according to a BGP monitoring protocol (BMP). The controller is configured to monitor a BGP route receiving status of the routing device. To support this embodiment, the BMP protocol needs to be extended. Currently, RFC 7854 of the BMP protocol supports seven message types: the following type 0 to type 6. In this embodiment, a new message type is added, that is, the following Type=TBD1: Diagnosis Message. The message is used to collect diagnosis information of all routing devices.

Type=0: Route Monitoring

Type=1: Statistics Report

Type=2: Peer Down Notification

Type=3: Peer Up Notification

Type=4: Initiation Message

Type=5: Termination Message

Type=6: Route Mirroring Message

Type=TBD1: Diagnosis Message

Specifically, a BMP session is established between the BGP speaker and the controller in the local autonomous system. A BGP session is established between the BGP speaker in the local autonomous system and the BGP speaker in the neighboring autonomous system. After generating the to-be-sent BGP route, the BGP speaker in the local autonomous system encapsulates the BGP route into the newly added diagnosis message. The diagnosis message is then forwarded to the controller. The controller parses the diagnosis message to obtain the BGP route, and performs a subsequent BGP route identification process.

In this embodiment, the BGP route obtained by the network device includes an autonomous system path attribute AS_PATH attribute, where the AS_PATH attribute may include one or more autonomous system numbers (AS number). In the application scenario corresponding to this embodiment, the AS_PATH attribute includes an AS number that is the same as an autonomous system number corresponding to the neighboring autonomous system. For ease of description, in this embodiment, the AS number corresponding to the neighboring autonomous system is referred to as a second AS number, and the AS number in the AS_PATH attribute that is the same as the second AS number is referred to as a first AS number. That is, the first AS number is equal to the second AS number.

Certainly, in addition to the AS_PATH attribute, the BGP route may further include other information, for example, an IP prefix. The IP prefix may be carried in a network layer reachability information (NLRI) field. The NLRI field may be carried in a BGP update message. In this application, the IP prefix may also be referred to as an IP address prefix.

An example is used below for description. It is assumed that a network includes four autonomous systems: an AS 100, an AS 200, an AS 300, and an AS 400. After a BGP route is originated from the AS 100, passes through the AS 200, and is forwarded to the AS 300, the AS 300 adds an AS number corresponding to the local autonomous system to the forefront (leftmost) of an AS_PATH attribute to generate a BGP route to be sent to the AS 400. Content of the to-be-sent BGP route is shown in Table 12.

TABLE 12

| IP prefix | 10.10.0.0/16 |
|---|---|
| AS_PATH attribute | 300, 200, 100 |

A network device corresponding to the AS 300 obtains the to-be-sent BGP route. Because the AS_PATH attribute does not include an AS number (400) corresponding to a neighboring autonomous system, execution of the BGP route identification method in this embodiment is not triggered, and processing is performed based on an existing route propagation process. For example, the BGP route is propagated to the AS 400. In this application, the AS 400 is an AS whose AS number is 400.

It is assumed that the to-be-sent BGP route generated by the AS 300 is shown in Table 13 or Table 14. Because the AS_PATH attribute includes the AS number (400) corresponding to the neighboring autonomous system, step S702 is performed to determine whether the BGP route is abnormal.

TABLE 13

| IP prefix | 10.10.0.0/16 |
|---|---|
| AS_PATH attribute | 300, 400 |

TABLE 14

| IP prefix | 10.10.0.0/16 |
|---|---|
| AS_PATH attribute | 300, 400, 100 |

S702: The network device determines, based on the first AS number and the second AS number, whether the BGP route is abnormal.

In this embodiment, an exception may be that the BGP route is forged. In addition, the exception may be a BGP route exception caused by a protocol configuration error.

BGP route forgery means that a route hijacker hijacks the BGP route and forges an IP prefix and/or an AS_PATH attribute in the BGP route. As a result, the forged BGP route seems to be originated by a specific AS or seems to be forwarded by some ASes.

The BGP route exception caused by the protocol configuration error means that, due to a configuration error of a specific autonomous system, a BGP route is propagated to an autonomous system that should not receive the BGP route. For example, the AS 1 advertises a BGP route to the AS 2, and indicates, in a community attribute of the BGP route, that the BGP route is dedicated to the AS 2. For example, the BGP route received by the AS 2 carries an NO_EXPORT communities attribute (NO_EXPORT communities attribute). A value of the NO_EXPORT communities attribute may be 0xFFFFFF01. If a protocol configuration of the AS 2 is correct, the AS 2 can determine, based on the NO_EXPORT communities attribute, that the BGP route is dedicated to the AS 2. The AS 2 forwards the BGP route to the AS 3 because of a protocol configuration error of the AS 2. In this scenario, the AS 3 should not receive the BGP route. In another scenario, the AS 2 forwards the BGP route to another AS. The another AS forwards the BGP route to the AS 1. In this scenario, the another AS and the AS 1 should not receive the BGP route. In this embodiment, the BGP route corresponding to this case is referred to as the "BGP route exception caused by the protocol configuration error".

In this embodiment, in the BGP route obtained by the network device, when the AS_PATH attribute includes the first AS number that is equal to the AS number corresponding to the neighboring autonomous system, it is determined that the BGP route is abnormal. When the AS_PATH attribute does not include the first AS number that is equal to the AS number corresponding to the neighboring autonomous system, it is determined that the BGP route is normal.

In a possible implementation, the network device determines, based on the first AS number, the second AS number, and a position of the first AS number in the AS_PATH attribute, whether the BGP route is abnormal.

In this embodiment, when the AS_PATH attribute in the BGP route obtained by the network device includes the first AS number that is equal to the AS number corresponding to the neighboring autonomous system, whether the BGP route is abnormal may be further determined based on the position of the first AS number in the AS_PATH attribute.

The AS_PATH attribute may include one or more AS numbers. Each AS number may be referred to as an element of the AS_PATH attribute. In this embodiment, the position of the first AS number in the AS_PATH attribute indicates an element number of the first AS number in the AS_PATH attribute.

It may be understood that the first AS number is equal to the second AS number corresponding to the neighboring autonomous system. When the first AS number is the $1^{st}$ element in the AS_PATH attribute, it indicates that the neighboring autonomous system is an origin AS corresponding to the BGP route. When the first AS number is not the $1^{st}$ element in the AS_PATH attribute, it indicates that the neighboring autonomous system is a transit AS corresponding to the BGP route.

The $1^{st}$ element is an element located in the rightmost position of the AS_PATH attribute.

After it is determined, based on the position of the first AS number in the AS_PATH attribute, that the neighboring autonomous system is the origin AS or transit AS corresponding to the BGP route, whether the BGP route is abnormal may be further determined based on the AS_PATH attribute.

In a possible implementation, if the first AS number is the $1^{st}$ element in the AS_PATH attribute, it indicates that the neighboring autonomous system is the origin AS corresponding to the BGP route. An AS number in the AS_PATH attribute that left neighbors to the first AS number may be determined. Then, whether the BGP route is forged can be determined by determining whether a BGP session is established between the neighboring autonomous system and an autonomous system corresponding to the AS number that left neighbors to the first AS number. For example, if no BGP session is established between the neighboring autonomous system and the autonomous system corresponding to the AS number that left neighbors to the first AS number, it indicates that the BGP route is forged.

In another possible implementation, if the first AS number is not the $1^{st}$ element in the AS_PATH attribute, it indicates that the neighboring autonomous system is a transit AS corresponding to the BGP route. An AS number that left neighbors to the first AS number in the AS_PATH attribute and an AS number that right neighbors to the first AS number in the AS_PATH attribute may be determined. Whether the BGP route is forged is determined by determining whether the autonomous system corresponding to the AS number that left neighbors to the first AS number and an autonomous system corresponding to the AS number that right neighbors to the first AS number establish a BGP session with the neighboring autonomous system. For example, if at least one of the autonomous system corresponding to the AS number that left neighbors to the first AS number and the autonomous system corresponding to the AS number that right neighbors to the first AS number does not establish a BGP session with the neighboring autonomous system, it indicates that the BGP route is forged.

In a specific implementation process, an actual connection relationship between autonomous systems in a network may be stored in a database of the local autonomous system, that is, a BGP session connection relationship is established between the autonomous systems. When obtaining the BGP route shown in Table 8 or Table 9, the network device may determine, based on the AS_PATH attribute in the BGP route and the actual connection relationship between autonomous systems stored in the database, whether the BGP route is forged.

It should be noted that the database in this embodiment may be a database on the routing device disposed in the local autonomous system, may be a database on another network device disposed in the local autonomous system, or may be a database on the controller or server that manages the local autonomous system. This is not specifically limited in this embodiment.

In a possible implementation, a global controller is disposed in the network. The global controller is connected to each autonomous system in the network, and is configured to obtain, from each autonomous system, route information and information about a connection relationship between the autonomous systems. In addition, the global controller is further configured to synchronize the collected information to local databases of the autonomous systems. In this way, each autonomous system can query a local database for route information of the autonomous system and the information about the connection relationship between autonomous systems.

Further, when the BGP route further includes an IP prefix, whether the BGP route is abnormal may be further determined with reference to the IP prefix. The following provides description with reference to specific implementations.

In a possible implementation, when the first AS number is the $1^{st}$ element in the AS_PATH attribute and the neighboring autonomous system has not advertised a route including the first IP prefix, the network device determines that the BGP route is abnormal.

Another expression manner is as follows: If the AS number corresponding to the neighboring autonomous system is the $1^{st}$ element in the AS_PATH attribute, and the neighboring autonomous system has not advertised a route including the first IP prefix, it is determined that the BGP route is abnormal.

In this application, "advertise" includes "originate (originated) and advertise" and "receive and advertise". "originate (originated) and advertise" means that the autonomous system originates a BGP route and advertises the BGP route to another AS. "receive and advertise" means that the autonomous system receives a BGP route from another AS and advertises the route to another AS. In this embodiment, "originate and advertise" may be referred to as "originate", and "receive and advertise" may be referred to as "forward".

That "the network device has not advertised a route including the first IP prefix" may be specifically that the network device has not advertised a route including an IP prefix before performing S402. That "the neighboring autonomous system has not advertised a route including the first IP prefix" may be specifically implemented in a first case or a second case. In the first case, the neighboring autonomous system has not originated or advertised the route including the first IP prefix. For example, the neighboring autonomous system does not generate the route including the first IP prefix. A database of the neighboring autonomous system does not record the route including the first IP prefix. In the second case, the neighboring autonomous system has not received and advertised the route including the first IP prefix. For example, the neighboring autonomous system has not received a route including the first IP prefix from another AS, or has not advertised a route including the first IP prefix to another AS.

In a specific implementation process, a database of the local autonomous system is used to record at least one second IP prefix advertised by the neighboring autonomous system. When the first IP prefix in the BGP route does not match any second IP prefix, it is determined that the BGP route is abnormal.

It should be noted that the foregoing match is a complete match, that is, a complete match between IP addresses and a complete match between masks.

For example, it is assumed that the database records that the neighboring autonomous system has advertised two IP prefixes: 10.1.0.0/16 and 10.2.0.0/16.

In a case, in the BGP route obtained by the routing device, an AS number corresponding to the neighboring autonomous system is the $1^{st}$ element in the AS_PATH attribute, and an IP prefix in the BGP route is 10.3.0.0/16. In this case, when the network device identifies the BGP route, because the IP prefix (10.3.0.0/16) in the BGP route does not match either of the two IP prefixes (10.1.0.0/16 and 10.2.0.0/16) recorded in the database, the network device determines that the BGP route is forged.

In another case, in the BGP route obtained by the routing device, an AS number corresponding to the neighboring autonomous system is the $1^{st}$ element in the AS_PATH attribute, and an IP prefix in the BGP route is 10.2.1.0/24. In this case, when the network device identifies the BGP route, because the IP prefix (10.2.1.0/24) in the BGP route does not match either of the two IP prefixes (10.1.0.0/16 and 10.2.0.0/16) recorded in the database, the network device determines that the BGP route is forged.

A scenario corresponding to this implementation is: The AS number corresponding to the neighboring autonomous system is the $1^{st}$ element in the AS_PATH attribute, but the neighboring autonomous system has not advertised a route including the first IP prefix. In this scenario, it indicates that the hijacker forges the IP prefix or the AS_PATH attribute of the BGP route. As a result, the forged route seems like that the IP prefix is advertised by the neighboring autonomous system. This case is completely a route forgery event, and this type of route forgery may be referred to as an exception type 7.

In another possible implementation, when the first AS number is the $1^{st}$ element in the AS_PATH attribute, the neighboring autonomous system has advertised a route including a second IP prefix, and the neighboring autonomous system has not advertised a route including the first IP prefix, the network device determines that the BGP route is abnormal. The first IP prefix is a subprefix of the second IP prefix.

Another expression manner is as follows: If the AS number corresponding to the neighboring autonomous system is the $1^{st}$ element in the AS_PATH attribute, and the first IP prefix is a subprefix of a specific second IP prefix that has been advertised by the neighboring autonomous system, but the neighboring autonomous system has not advertised the first IP prefix, it is determined that the BGP route is abnormal.

In this application, that the neighboring autonomous system has advertised a route including a second IP prefix may be: The neighboring autonomous system has advertised a route including the second IP prefix before the network device performs S702.

In this embodiment, that "the first IP prefix is a subprefix of the second IP prefix" means that a network address set indicated by the first IP prefix is a subset of a network address set indicated by the second IP prefix. For example, it is assumed that the first IP prefix is 10.10.192.0/24, and the second IP prefix is 10.10.128.0/17. Because the network address set corresponding to the first IP prefix is network addresses from 10.10.192.0 to 10.10.192.255, the network address set corresponding to the second IP prefix is network addresses from 10.10.128.0 to 10.10.255.255, and the network address set corresponding to the first IP prefix is a subset of the network address set corresponding to the second IP prefix. Therefore, it is considered that the first IP prefix is a subprefix of the second IP prefix.

A scenario corresponding to this implementation is: The AS number corresponding to the neighboring autonomous system is the $1^{st}$ element in the AS_PATH attribute, and the first IP prefix is a subprefix of a specific second IP prefix that has been advertised by the neighboring autonomous system, but the neighboring autonomous system has not advertised the first IP prefix. In this scenario, it indicates that the hijacker forges the IP prefix or the AS_PATH attribute of the BGP route. As a result, the forged route seems like a subprefix of a specific IP prefix that has been advertised by the neighboring autonomous system. This case is completely a route forgery event, and this type of route forgery is referred to as an exception type 9.

In still another possible implementation, when the first AS number is the $1^{st}$ element in the AS_PATH attribute and the neighboring autonomous system has advertised a route including the first IP prefix to an autonomous system corresponding to an element in the AS_PATH attribute that neighbors to the first AS number, the network device determines that the BGP route is normal.

For example, it is assumed that the database records that the neighboring autonomous system AS 100 has advertised, to the AS 200, a BGP route whose IP prefix is 10.10.10.0/24. If the IP prefix of the BGP route received by the network device is 10.10.10.0/24, and the AS_PATH attribute is 300, 200, and 100, it is determined that the BGP route is normal.

In this embodiment, when it is determined that the BGP route is normal, it indicates that a loop type of the BGP route is a normal loop, and the BGP route may be discarded or ignored in a processing manner in a conventional technology, to avoid a routing loop.

In still another possible implementation, when the first AS number is the $1^{st}$ element in the AS_PATH attribute, and no BGP session is established between the neighboring autonomous system and an autonomous system corresponding to a third AS number, the network device determines that the BGP route is abnormal. The third AS number is an element in the AS_PATH attribute that neighbors to the first AS number.

The third AS number may be one AS number, or may be two AS numbers.

In other words, when no BGP session is established between the neighboring autonomous system and an autonomous system corresponding to at least one of the one or more AS numbers in the AS_PATH attribute that neighbor to the first AS number, it is determined that the BGP route is abnormal.

In this application, that no BGP session is established between the neighboring autonomous system and an autonomous system corresponding to the third AS number may be specifically: Before the network device performs S702, no BGP session is established between the neighboring autonomous system and the autonomous system corresponding to the third AS number.

In a specific implementation process, a database is further used to store a connection relationship between autonomous systems, that is, store whether a BGP session is established between the autonomous systems. After obtaining the BGP route and determining, based on the AS_PATH attribute, AS numbers neighboring to the first AS number, the network device may determine, by querying the database, whether BGP sessions are established between the local autonomous system and autonomous systems corresponding to the neighboring AS numbers.

For example, it is assumed that the database records that a BGP session is established between the AS 100 and the AS 200, and that a BGP session is also established between the AS 100 and the AS 300.

In a case, it is assumed that the AS 200 is to send a BGP route to the neighboring AS 100, where an AS_PATH attribute in the to-be-sent BGP route is 200, 100, and 400. It can be learned, by querying the database, that no BGP session is actually established between the AS 400 and the AS 100; it is determined that the BGP route is abnormal. In this case, the third AS number in this embodiment is specifically 400.

In another case, it is assumed that the AS 200 is to send a BGP route to the neighboring AS 100, where an AS_PATH attribute in the to-be-sent BGP route is 500, 100, and 400. It can be learned, by querying the database, that no BGP session is actually established between the AS 400 and the AS 100, and no BGP session is established between the AS 500 and the AS 100; it is determined that the BPG route is abnormal. In this case, the third AS number in this embodiment includes 400 and 500.

In a scenario corresponding to this implementation, in the BGP route obtained by the network device, an AS number corresponding to the neighboring autonomous system is not the $1^{st}$ element in the AS_PATH attribute, and no BGP session is established between the local autonomous system and an autonomous system corresponding to at least one of elements in the AS_PATH attribute that neighbor to the AS number corresponding to the neighboring autonomous system. In this scenario, it indicates that after hijacking the route, the hijacker tampers with the AS_PATH attribute in the route. As a result, the tampered route seems to have passed through the neighboring autonomous system. Therefore, this case is completely a route forgery event. In this embodiment, this type of the BGP route is referred to as an exception type 9.

In still another possible implementation, the BGP route includes a first Internet protocol IP prefix. When the first AS number is not the $1^{st}$ element in the AS_PATH attribute, a BGP session is established between a left AS and the neighboring autonomous system, a BGP session is established between a right AS and the neighboring autonomous system, the neighboring autonomous system has received a route that includes the first IP prefix and that is from the right AS, and the neighboring autonomous system has not advertised a route including the first IP prefix to the left AS, it is determined that the BGP route is abnormal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

In a specific implementation process, in addition to storing whether a BGP session is established between autonomous systems, the database is further used to store historical BGP route information forwarded by the neighboring autonomous system. For example, the neighboring autonomous system has received IP prefixes from specific autonomous systems and has advertised IP prefixes to specific autonomous systems. After obtaining the BGP route, the network device determines, based on the AS_PATH attribute, AS numbers neighboring to the first AS number. Then, whether BGP sessions are established between the neighboring autonomous system and autonomous systems corresponding to the neighboring AS numbers is determined by querying the database. In addition, whether the neighboring autonomous system has received an IP prefix in the BGP route from the autonomous systems corresponding to the neighboring AS numbers is determined, or whether the neighboring autonomous system has advertised an IP prefix in the BGP route to the autonomous systems corresponding to the neighboring AS numbers is determined.

In the following example, it is assumed that the AS 200 is to send a BGP route to the neighboring autonomous system AS 100. In the to-be-sent BGP route, an AS_PATH attribute is 200, 100, and 400, and an IP prefix is 10.10.10.0/24. When the network device in the AS 200 identifies a route, the network device determines that the BPG route is abnormal, if the network device finds, by querying a database, that a BGP session is established between the AS 400 and the neighboring autonomous system AS 100, and a BGP session is also established between the AS 200 and the neighboring autonomous system AS 100, but the neighboring autonomous system AS 100 has not received a route whose IP prefix is 10.10.10.0/24 from the AS 400.

Alternatively, when the network device in the AS 200 identifies a route, the network device determines that the BPG route is abnormal, if the network device finds, by querying a database, that a BGP session is established between the AS 400 and the neighboring autonomous system AS 100, a BGP session is also established between the AS 200 and the neighboring autonomous system AS 100, and the neighboring autonomous system AS 100 has received a route including an IP prefix 10.10.10.0/24 from the AS 400, but the neighboring autonomous system AS 100 has not advertised a route including the IP prefix is 10.10.10.0/24 to the AS 200.

In a scenario corresponding to this implementation, in the BGP route obtained by the network device, an AS number corresponding to the neighboring autonomous system is not the $1^{st}$ element in the AS_PATH attribute. In addition, a BGP session is established between the neighboring autonomous system and each of autonomous systems corresponding to a left neighboring element and a right neighboring element in elements in the AS_PATH attribute that neighbor to the AS number corresponding to the neighboring autonomous system, but the neighboring autonomous system has not received a route including the IP prefix from the autonomous system corresponding to the right neighboring element or has not advertised a route including the IP prefix to the autonomous system corresponding to the left neighboring element. In this scenario, it indicates that after hijacking the route, a hijacker tampers with the IP prefix or the AS_PATH attribute in the route. As a result, the tampered route seems to have passed through the neighboring autonomous system. Therefore, this case is completely a route forgery event. In this embodiment, this type of the BGP route is referred to as an exception type 10.

In still another possible implementation, when the first AS number is not the $1^{st}$ element in the AS_PATH attribute, a BGP session is established between a left AS and the neighboring autonomous system, a BGP session is established between a right AS and the neighboring autonomous system, the neighboring autonomous system has received a route that includes the first IP prefix and that is from the right AS, and the neighboring autonomous system has advertised the route including the first IP prefix to the left AS, the network device determines that the BGP route is normal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

In this embodiment, when it is determined that the BGP route is normal, it indicates that a loop type of the BGP route is a normal loop, and the BGP route may be discarded or ignored in a processing manner in a conventional technology, to avoid a routing loop.

Based on the foregoing embodiments, after the network device determines that the BGP route is abnormal, the method further includes:

The network device generates log information and/or alarm information corresponding to a route exception, to notifying an autonomous system corresponding to each AS number in the AS_PATH attribute to correct the route.

Specifically, after the BGP route exception is identified, the log information corresponding to the BGP route exception may be locally generated on the network device, and the alarm information may be further reported to a network management server corresponding to a local autonomous system, so that a user can find abnormal route propagation in the network in a timely manner and correct the route in a timely manner. This improves network security and stability.

According to the BGP route identification method provided in this embodiment includes: The network device obtains the BGP route, where the BGP route includes the autonomous system path attribute AS_PATH attribute, the AS_PATH attribute includes the first autonomous system number AS number, the AS number corresponding to the neighboring autonomous system of the autonomous system that the network device is located in or manages is the second AS number, and the first AS number is equal to the second AS number; and the network device determines, based on the first AS number and the second AS number, whether the BGP route is abnormal. In this way, an abnormal loop route caused by a reason such as route hijacking can be found in a timely manner, thereby improving network security.

Figure 10:
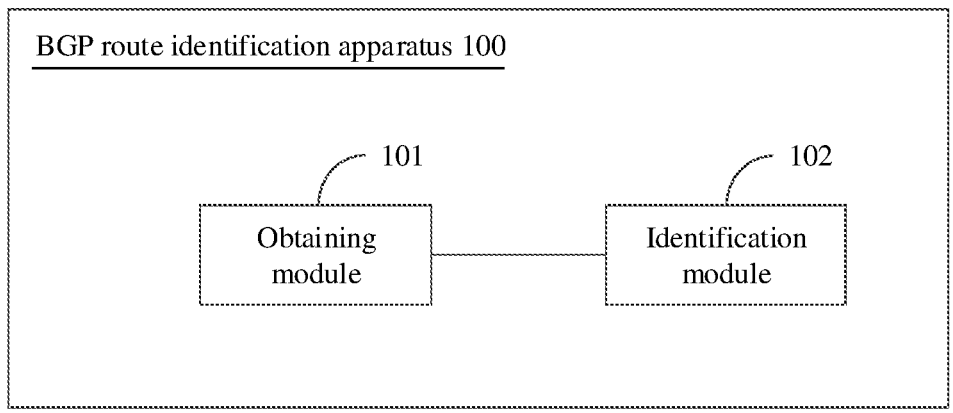
FIG. 10 is a schematic structural diagram of a BGP route identification apparatus according to an embodiment of this application.

FIG. 10 is a schematic structural diagram of a BGP route identification apparatus according to an embodiment of this application. The BGP route identification apparatus in this embodiment may be disposed in a network device of an autonomous system serving as a receiver. The network device may be a routing device in the autonomous system serving as the receiver, and may also be a controller that manages the autonomous system serving as the receiver. As shown in FIG. 10, the BGP route identification apparatus 100 in this embodiment includes an obtaining module 101 and an identification module 102.

The obtaining module 101 is configured to obtain a BGP route. The BGP route includes an autonomous system path attribute AS_PATH attribute, the AS_PATH attribute includes a first autonomous system number AS number, an AS number corresponding to an autonomous system that the network device is located in or manages is a second AS number, and the first AS number is equal to the second AS number.

The identification module 102 is configured to determine, based on the first AS number and the second AS number, whether the BGP route is abnormal.

Optionally, the BGP route includes a first Internet protocol IP prefix, and the identification module 102 is specifically configured to: when the first AS number is the $1^{st}$ element in the AS_PATH attribute and the network device has not advertised a route including the first IP prefix, determine that the BGP route is abnormal.

Optionally, the BGP route includes a first Internet protocol IP prefix, and the identification module 102 is specifically configured to: when the first AS number is the $1^{st}$ element in the AS_PATH attribute, the network device has advertised a route including a second IP prefix, and the network device has not advertised a route including the first IP prefix, determine that the BGP route is abnormal, where the first IP prefix is a subprefix of the second IP prefix.

Optionally, the BGP route includes a first Internet protocol IP prefix, and the identification module 102 is specifically configured to: when the first AS number is the $1^{st}$ element in the AS_PATH attribute, the network device has advertised, to a specific AS, a route that is dedicated to the specific AS and that includes the first IP prefix, and the AS_PATH attribute includes a third AS number or does not include the second AS number, determine that the BGP route is abnormal.

Optionally, the identification module 102 is specifically configured to: when the first AS number is not the $1^{st}$ element in the AS_PATH attribute, and no BGP session is established between an autonomous system that the network device is located in or manages and an autonomous system corresponding to a fourth AS number, determine that the BGP route is abnormal, where the fourth AS number is an element in the AS_PATH attribute that neighbors to the first AS number.

Optionally, the BGP route includes a first Internet protocol IP prefix, and the identification module 102 is specifically configured to: when the first AS number is not the $1^{st}$ element in the AS_PATH attribute, a BGP session is established between a left AS and an autonomous system that the network device is located in or manages, a BGP session is established between a right AS and the autonomous system that the network device is located in or manages, and the network device has not received a route that includes the first IP prefix and that is from the right AS or the network device has not advertised a route including the first IP prefix to the left AS, determine that the BGP route is abnormal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

The BGP route identification apparatus in this embodiment may be configured to execute the method embodiment shown in FIG. 4. Implementation principles and technical effects of the BGP route identification apparatus are similar to those of the method in FIG. 4, and details are not described herein again.

Figure 11:
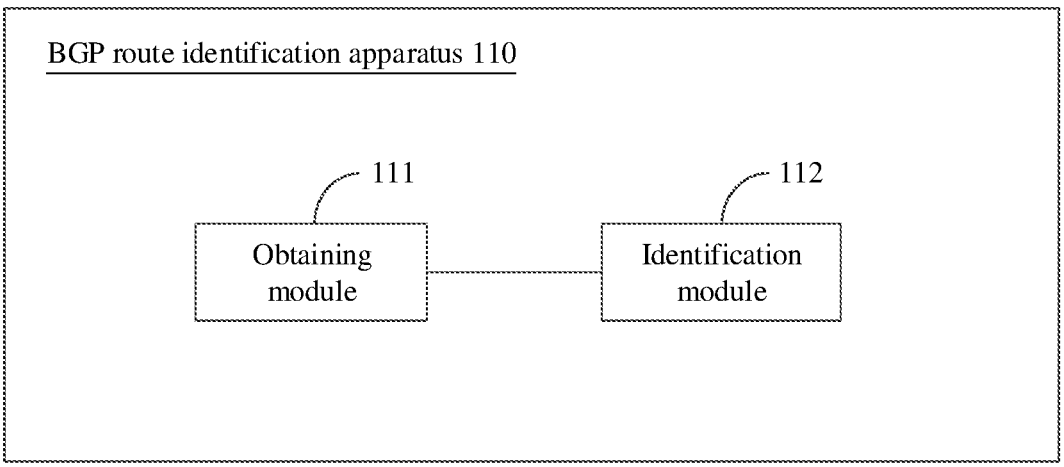
FIG. 11 is a schematic structural diagram of a BGP route identification apparatus according to another embodiment of this application.

FIG. 11 is a schematic structural diagram of a BGP route identification apparatus according to another embodiment of this application. The BGP route identification apparatus in this embodiment may be disposed in a network device of an autonomous system serving as a sender. The network device may be a routing device in the autonomous system serving as the sender, and may also be a controller that manages the autonomous system serving as the sender. As shown in FIG. 11, the BGP route identification apparatus 110 in this embodiment includes an obtaining module 11 and an identification module 112.

The obtaining module in is configured to obtain a BGP route. The BGP route includes an autonomous system path attribute AS_PATH attribute, the AS_PATH attribute includes a first autonomous system number AS number, an AS number corresponding to a neighboring autonomous system of an autonomous system that the network device is located in or manages is a second AS number, and the first AS number is equal to the second AS number.

The identification module 112 is configured to determine, based on the first AS number and the second AS number, whether the BGP route is abnormal.

Optionally, the BGP route includes a first Internet protocol IP prefix, and the identification module 112 is specifically configured to: when the first AS number is the $1^{st}$ element in the AS_PATH attribute and the neighboring autonomous system has not advertised a route including the first IP prefix, determine that the BGP route is abnormal.

Optionally, the BGP route includes a first Internet protocol IP prefix, and the identification module 112 is specifically configured to: when the first AS number is the $1^{st}$ element in the AS_PATH attribute, the neighboring autonomous system has advertised a route including a second IP prefix, and the neighboring autonomous system has not advertised a route including the first IP prefix, determine that the BGP route is abnormal, where the first IP prefix is a subprefix of the second IP prefix.

Optionally, the identification module 112 is specifically configured to: when the first AS number is not the $1^{st}$ element in the AS_PATH attribute and no BGP session is established between the neighboring autonomous system and an autonomous system corresponding to a third AS number, determine that the BGP route is abnormal, where the third AS number is an element in the AS_PATH attribute that neighbors to the first AS number.

Optionally, the BGP route includes a first Internet protocol IP prefix, and the identification module 112 is specifically configured to: when the first AS number is not the $1^{st}$ element in the AS_PATH attribute, a BGP session is established between the neighboring autonomous system and a left AS, a BGP session is established between the neighboring autonomous system and a right AS, the neighboring autonomous system has received a route that includes a first IP prefix and that is from the right AS, and the neighboring autonomous system has not advertised a route including the first IP prefix to the left AS, determine that the BGP route is abnormal.

An AS number corresponding to the right AS and an AS number corresponding to the left AS are two elements in the AS_PATH attribute that neighbor to the first AS number; the AS number corresponding to the right AS is located on the right of the first AS number; and the AS number corresponding to the left AS number is located on the left of the first AS number.

The BGP route identification apparatus in this embodiment may be configured to execute the method embodiment shown in FIG. 7. Implementation principles and technical effects of the BGP route identification apparatus are similar to those of the method in FIG. 7, and details are not described herein again.

Figure 12:
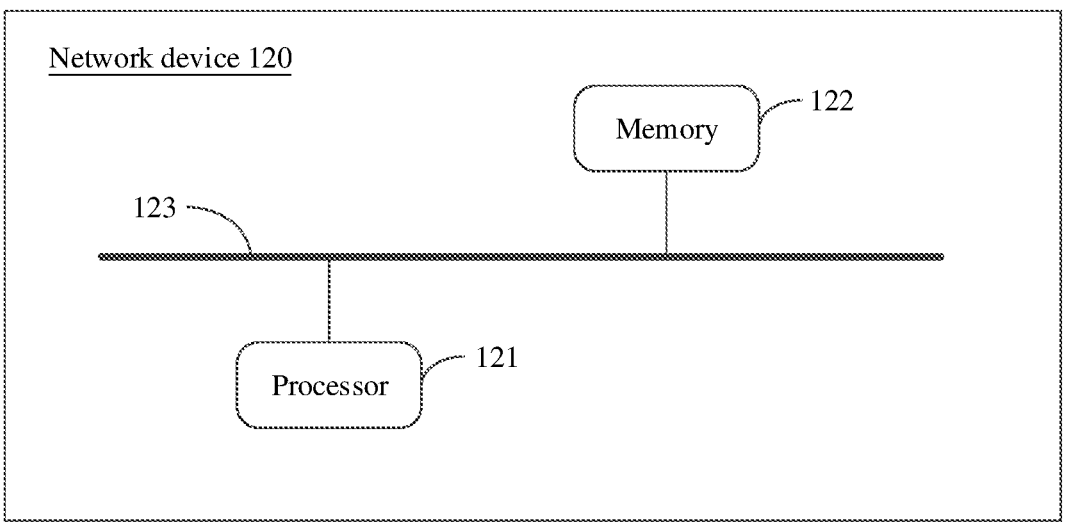
FIG. 12 is a schematic structural diagram of hardware of a network device according to an embodiment of this application.

FIG. 12 is a schematic structural diagram of hardware of a network device according to an embodiment of this application. The network device in this embodiment may be a routing device in an autonomous system, or may be a controller that manages an autonomous system. As shown in FIG. 12, the network device 120 includes a processor 121 and a memory 122. The memory 122 is configured to store a computer program. The processor 121 is configured to execute the computer program stored in the memory, to implement the method performed by the network device in the foregoing embodiment. For details, refer to related descriptions in the foregoing method embodiments.

Optionally, the memory 122 may be independent, or may be integrated with the processor 121.

When the memory 122 is a device independent of the processor 121, the network device 120 may further include: a bus 123, configured to connect the memory 122 and the processor 121.

The network device provided in this embodiment may be configured to perform the method performed by the network device shown in any one of the foregoing method embodiments. Implementation principles and technical effects of the network device are similar to those of the foregoing method embodiments, and details are not described herein again in this embodiment.

An embodiment of this application further provides a storage medium. The storage medium includes a computer program, and the computer program is used to implement the BGP route identification method performed by the network device in any one of the foregoing method embodiments.

An embodiment of this application further provides a chip, including a memory, a processor, and a computer program. The computer program is stored in the memory, and the processor runs the computer program to perform the BGP route identification method performed by the network device in any one of the foregoing method embodiments.

In the embodiments provided in this application, it should be understood that the disclosed device and method may be implemented in other manners. For example, the described device embodiment is merely an example. For example, division into the modules is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electrical, mechanical, or other forms.

The modules described as separate parts may or may not be physically separate, and parts displayed as modules may or may not be physical units, may be located in one position, or may be distributed on a plurality of network units. Some or all the modules may be selected based on actual requirements to achieve the objectives of the solutions of the embodiments.

In addition, the functional modules in the embodiments of this application may be integrated into one processing unit, or each of the modules may exist alone physically, or two or more modules are integrated into one unit. The units of the foregoing modules may be implemented in a form of hardware, or may be implemented in a form of hardware in addition to a software functional unit.

When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) or a processor to perform some of the steps of the methods described in the embodiments of this application.

It should be understood that the processor may be a central processing unit (CPU for short), or may be another general-purpose processor, a digital signal processor (DSP for short), an application-specific integrated circuit (ASIC for short), or the like. The general-purpose processor may be a microprocessor, or the processor may be any conventional processor or the like. The steps of the methods disclosed with reference to this application may be directly implemented by a hardware processor, or may be implemented by a combination of hardware and a software module in the processor.

The memory may include a high-speed RAM memory, and may further include a non-volatile memory NVM, for example, at least one magnetic disk memory, or may be a USB flash drive, a removable hard disk, a read-only memory, a magnetic disk, an optical disc, or the like.

The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

The storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The storage medium may be any available medium accessible to a general-purpose or dedicated computer.

For example, the storage medium is coupled to the processor, so that the processor can read information from the storage medium or write information into the storage medium. Certainly, the storage medium may be a component of the processor. The processor and the storage medium may be located in an application-specific integrated circuit (Application Specific Integrated Circuits, ASIC for short). Certainly, the processor and the storage medium may alternatively exist in an electronic device or a controlling device as discrete components.

What is claimed is:

1. A method comprising:
   obtaining, by a network device, a border gateway protocol (BGP) route, wherein the BGP route comprises an autonomous system path attribute (AS_PATH attribute), the AS_PATH attribute comprises one or more autonomous system (AS) numbers corresponding to one or more autonomous systems, among which BGP route information is routed starting from an origin autonomous system originating routing of the BGP route information, and wherein the one or more AS numbers comprise a first AS number, the network device is located in or manages a first autonomous system corresponding to a second AS number, and the first AS number is equal to the second AS number; and determining, by the network device based on the BGP route, the first AS number, the second AS number, and whether the first AS number corresponds to the origin autonomous system, whether the BGP route is abnormal, wherein determining whether the BGP route is abnormal comprises:

when the first AS number does not correspond to the origin autonomous system, and no BGP session is established between the first autonomous system and a second autonomous system corresponding to a fourth AS number in the one or more AS numbers, determining, by the network device, that the BGP route is abnormal, wherein the fourth AS number corresponds to a neighbor autonomous system of the first autonomous system.

2. The method according to claim 1, wherein the BGP route comprises a first Internet protocol (IP) prefix; and wherein determining whether the BGP route is abnormal further comprises:

when the first AS number corresponds to the origin autonomous system and the network device has not advertised a route comprising the first IP prefix, determining, by the network device, that the BGP route is abnormal.

3. The method according to claim 1, wherein the BGP route comprises a first Internet protocol (IP) prefix; and wherein determining whether the BGP route is abnormal further comprises:

when the first AS number corresponds to the origin autonomous system, the network device has advertised a route comprising a second IP prefix, and the network device has not advertised a route comprising the first IP prefix, determining, by the network device, that the BGP route is abnormal, wherein the first IP prefix is a subprefix of the second IP prefix.

4. The method according to claim 1, wherein the BGP route comprises a first Internet protocol (IP) prefix; and wherein determining whether the BGP route is abnormal further comprises:

when the first AS number corresponds to the origin autonomous system, the network device has advertised, to a specific AS, a route that is dedicated to the specific AS and that comprises the first IP prefix, and the AS_PATH attribute comprises a third AS number, determining, by the network device, that the BGP route is abnormal.

5. The method according to claim 1, wherein the BGP route comprises a first Internet protocol (IP) prefix; and wherein determining whether the BGP route is abnormal further comprises:

when the first AS number does not correspond to the origin autonomous system, a BGP session is established between a first neighbor autonomous system of the first autonomous system and the first autonomous system, a BGP session is established between a second neighbor autonomous system of the first autonomous system and the first autonomous system, and the network device has not received a route that comprises the first IP prefix and that is from the second neighbor autonomous system or the network device has not advertised a route comprising the first IP prefix to the first neighbor autonomous system, determining, by the network device, that the BGP route is abnormal, wherein the first neighbor autonomous system and the second neighbor autonomous system have respective AS numbers comprised in the one or more AS numbers.

6. A method comprising:

obtaining, by a network device, a border gateway protocol (BGP) route, wherein the BGP route comprises an autonomous system path attribute (AS_PATH attribute), the AS_PATH attribute comprises one or more autonomous system (AS) numbers corresponding to one or more autonomous systems, among which BGP route information is routed starting from an origin autonomous system originating routing of the BGP route information, and wherein the one or more AS numbers comprise a first AS number, the network device is located in or manages an autonomous system that has a neighboring autonomous system corresponding to a second AS number, and the first AS number is equal to the second AS number; and determining, by the network device based on the BGP route, the first AS number and the second AS number, whether the BGP route is abnormal.

7. The method according to claim 6, wherein the BGP route comprises a first Internet protocol (IP) prefix; and wherein determining whether the BGP route is abnormal comprises:

when the first AS number corresponds to the origin autonomous system and the neighboring autonomous system has not advertised a route comprising the first IP prefix, determining, by the network device, that the BGP route is abnormal.

8. The method according to claim 6, wherein the BGP route comprises a first Internet protocol (IP) prefix; and wherein determining whether the BGP route is abnormal comprises:

when the first AS number corresponds to the origin autonomous system, the neighboring autonomous system has advertised a route comprising a second IP prefix, and the neighboring autonomous system has not advertised a route comprising the first IP prefix, determining, by the network device, that the BGP route is abnormal, wherein the first IP prefix is a subprefix of the second IP prefix.

9. The method according to claim 6, wherein the BGP route comprises a first IP prefix; and wherein determining whether the BGP route is abnormal comprises:

when the first AS number does not correspond to the origin autonomous system, a BGP session is established between the neighboring autonomous system and a first neighbor autonomous system of the neighboring autonomous system, a BGP session is established between the neighboring autonomous system and a second neighbor autonomous system of the neighboring autonomous system, the neighboring autonomous system has received a route that comprises the first IP prefix and that is from the second neighbor autonomous system, and the neighboring autonomous system has not advertised a route comprising the first IP prefix to the first neighbor autonomous system, determining, by the network device, that the BGP route is abnormal, wherein the first neighbor autonomous system and the second neighbor autonomous system have respective AS numbers comprised in the one or more AS numbers.

10. An apparatus comprising:
at least one processor; and
one or more memories coupled to the at least one processor and storing instructions for execution by the at least one processor, the instructions, when executed by the at least one processor, cause the apparatus to:
obtain a border gateway protocol (BGP) route, wherein the BGP route comprises an autonomous system path attribute (AS_PATH attribute), the AS_PATH attribute comprises one or more autonomous system (AS) numbers corresponding to one or more autonomous systems, among which BGP route information is routed starting from an origin autonomous system originating routing of the BGP route information, and wherein the one or more AS numbers comprise a first AS number, the apparatus is located in or manages a first autonomous system corresponding to a second AS number, and the first AS number is equal to the second AS number; and
determine, based on the BGP route, the first AS number, the second AS number, and whether the first AS number corresponds to the origin autonomous system, whether the BGP route is abnormal, wherein determining whether the BGP route is abnormal comprises:
when the first AS number does not correspond to the origin autonomous system, and no BGP session is established between the first autonomous system and a second autonomous system corresponding to a fourth AS number in the one or more AS numbers, determining that the BGP route is abnormal, wherein the fourth AS number corresponds to a neighbor autonomous system of the first autonomous system.

11. The apparatus according to claim 10, wherein the BGP route comprises a first Internet protocol (IP) prefix, and the instructions, when executed by the at least one processor, further cause the apparatus to:
when the first AS number corresponds to the origin autonomous system and the apparatus has not advertised a route comprising the first IP prefix, determine that the BGP route is abnormal.

12. The apparatus according to claim 10, wherein the BGP route comprises a first Internet protocol (IP) prefix, and the instructions, when executed by the at least one processor, further cause the apparatus to:
when the first AS number corresponds to the origin autonomous system, the apparatus has advertised a route comprising a second IP prefix, and the apparatus has not advertised a route comprising the first IP prefix, determine that the BGP route is abnormal, wherein the first IP prefix is a subprefix of the second IP prefix.

13. The apparatus according to claim 10, wherein the BGP route comprises a first Internet protocol (IP) prefix, and the instructions, when executed by the at least one processor, further cause the apparatus to:
when the first AS number corresponds to the origin autonomous system, the apparatus has advertised, to a specific AS, a route that is dedicated to the specific AS and that comprises the first IP prefix, and the AS_PATH attribute comprises a third AS number, determine that the BGP route is abnormal.

14. The apparatus according to claim 10, wherein the BGP route comprises a first Internet protocol (IP) prefix, and the instructions, when executed by the at least one processor, further cause the apparatus to:
when the first AS number does not correspond to the origin autonomous system, a BGP session is established between a first neighbor autonomous system of the first autonomous system and the first autonomous system, a BGP session is established between a second neighbor autonomous system of the first autonomous system and the first autonomous system, and the apparatus has not received a route that comprises the first IP prefix and that is from the second neighbor autonomous system or the apparatus has not advertised a route comprising the first IP prefix to the first neighbor autonomous system, determine that the BGP route is abnormal, wherein the first neighbor autonomous system and the second neighbor autonomous system have respective AS numbers comprised in the one or more AS numbers.

15. An apparatus comprising:
at least one processor; and
one or more memories coupled to the at least one processor and storing instructions for execution by the at least one processor, the instructions, when executed by the at least one processor, cause the apparatus to:
obtain a border gateway protocol (BGP) route, wherein the BGP route comprises an autonomous system path attribute (AS_PATH attribute), the AS_PATH attribute comprises one or more autonomous system (AS) numbers corresponding to one or more autonomous systems, among which BGP route information is routed starting from an origin autonomous system originating routing of the BGP route information, and wherein the one or more AS numbers comprise a first AS number, the apparatus is located in or manages an autonomous system that has a neighboring autonomous system corresponding to a second AS number, and the first AS number is equal to the second AS number; and
determine, based on the BGP route, the first AS number and the second AS number, whether the BGP route is abnormal.

16. The apparatus according to claim 15, wherein the BGP route comprises a first Internet protocol (IP) prefix, and the instructions, when executed by the at least one processor, further cause the apparatus to:
when the first AS number corresponds to the origin autonomous system and the neighboring autonomous system has not advertised a route comprising the first IP prefix, determine that the BGP route is abnormal.

17. The apparatus according to claim 15, wherein the BGP route comprises a first Internet protocol (IP) prefix, and the instructions, when executed by the at least one processor, further cause the apparatus to:
when the first AS number corresponds to the origin autonomous system, the neighboring autonomous system has advertised a route comprising a second IP prefix, and the neighboring autonomous system has not advertised a route comprising the first IP prefix, determine that the BGP route is abnormal, wherein the first IP prefix is a subprefix of the second IP prefix.

* * * * *